United States Patent
Yokota et al.

(10) Patent No.: US 9,086,812 B2
(45) Date of Patent: Jul. 21, 2015

(54) STORAGE DEVICE, CONTROL METHOD FOR SAME AND SYSTEM MANAGEMENT PROGRAM

(75) Inventors: Haruo Yokota, Tokyo (JP); Satoshi Hikida, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 172 days.

(21) Appl. No.: 13/579,974

(22) PCT Filed: Feb. 17, 2011

(86) PCT No.: PCT/JP2011/053413
§ 371 (c)(1),
(2), (4) Date: Aug. 20, 2012

(87) PCT Pub. No.: WO2011/102429
PCT Pub. Date: Aug. 25, 2011

(65) Prior Publication Data
US 2012/0317354 A1    Dec. 13, 2012

(30) Foreign Application Priority Data

Feb. 19, 2010  (JP) ................. 2010-034323

(51) Int. Cl.
*G06F 12/08*  (2006.01)
*G06F 3/06*   (2006.01)
*G06F 11/20*  (2006.01)

(52) U.S. Cl.
CPC .............. *G06F 3/0625* (2013.01); *G06F 3/068* (2013.01); *G06F 3/0634* (2013.01); *G06F 11/2071* (2013.01); *Y02B 60/1246* (2013.01)

(58) Field of Classification Search
CPC .... G06F 3/0625; G06F 3/065; G06F 12/0866
See application file for complete search history.

(56) References Cited

U.S. PATENT DOCUMENTS 7,111,189 B1 *  9/2006  Sicola et al. ................. 714/6.21
7,363,451 B2 *  4/2008  Kolli et al. .................... 711/167
(Continued)

FOREIGN PATENT DOCUMENTS

JP           6067808 A      3/1994
JP        2004334739 A     11/2004
(Continued)

OTHER PUBLICATIONS

Colarelli et al., "The Case for Massive Arrays of Idle Disks (MAID)", [online], Jan. 7, 2001, pp. 1-6, [retrieval date May 17, 2011], Internet <URL:http://www.usenix.org/events/fast02/wips/colarelli.pdf>.
(Continued)

*Primary Examiner* — Charles Rones
*Assistant Examiner* — Tian-Pong Chang
(74) *Attorney, Agent, or Firm* — Squire Patton Boggs (US) LLP

(57) ABSTRACT

A storage device has plural data disks including a primary data area and a backup data area. Performance and reliability are secured while conserving power. A system management means includes a disk rotational state detection means, a disk rotational state control means for rotating or stopping a data disk, and a data placement control means for accessing the data disk to move the data. The data placement control means, if the data disk of the primary or backup side has been stopped at writing time, spins up and accesses thereof, and if the data disk of the primary or backup side has been stopped at reading time, prioritizes the side that is being rotated and accesses thereto, and if the data disk of the primary and backup side have both been stopped at reading time, spins up and accesses the side that has been stopped for the longer time.

9 Claims, 18 Drawing Sheets

(56) References Cited

U.S. PATENT DOCUMENTS

| | | | |
|---|---|---|---|
| 7,809,884 B1* | 10/2010 | Linnell | 711/114 |
| 8,478,945 B2* | 7/2013 | Ash et al. | 711/143 |
| 2004/0111558 A1* | 6/2004 | Kistler et al. | 711/114 |
| 2006/0143388 A1* | 6/2006 | Wintergerst et al. | 711/130 |
| 2007/0124555 A1* | 5/2007 | Zohar et al. | 711/163 |
| 2007/0168606 A1* | 7/2007 | Takai et al. | 711/113 |
| 2009/0083558 A1* | 3/2009 | Sugiki et al. | 713/320 |
| 2009/0282196 A1* | 11/2009 | Petev et al. | 711/134 |
| 2010/0121892 A1* | 5/2010 | Matsumoto et al. | 707/822 |

FOREIGN PATENT DOCUMENTS

| | | |
|---|---|---|
| JP | 2005539303 A | 12/2005 |
| JP | 2007193440 A | 8/2007 |
| JP | 2009080603 A | 4/2009 |
| JP | 2009187450 A | 8/2009 |

OTHER PUBLICATIONS

International Search Report issued in the corresponding International Application No. PCT/JP2011/053413, dated May 24, 2011.

* cited by examiner

STORAGE DEVICE, CONTROL METHOD FOR SAME AND SYSTEM MANAGEMENT PROGRAM

TECHNICAL FIELD

The present invention is related to: a storage device which includes a plurality of data disks each having a primary data area and a backup data area and stores apiece of data both in a primary data area in one of the data disks and in a backup data area in another data disk thereof; and control of the storage device.

BACKGROUND ART

A conventional technique has been known in which a data is made redundant and can be quickly recovered in case of failure by storing an original data and a backup data of the original data in a distributed manner in a plurality of data disks of a storage device (see, for example, Patent Document 1). In such a storage device, a data disk has plural logical storage sections which include a primary area in which an original data is stored and a backup area in which a backup data of the original data is stored. The storage device is equipped with a plurality of data disks each having a primary data area and a backup data area. The storage device stores an original data in a primary data area of one data disk (also referred to as a disk on a primary side) and also stores a backup data of the original data in a backup data area of another data disk (also referred to as a disk on a backup side). This makes it possible for a storage device of this type to quickly recover data in case of failure of a disk on the primary side or a disk on the backup side, given both the disk on the primary side and the disk on the backup side are constantly rotated.

Specialized storage devices having a large number of data disks for storing therein enormous amounts of data have been used for various purposes these years in order to support a current information society such as, for example, the Internet. The size and the number of such storage devices have been increased year by year in response to increasing amounts of information. In the storage device, a write request for writing a data to be stored or a read request for reading a stored data has also been increasing. On the other hand, power consumption of the storage device has also been increased. Reduction in the power consumption and management cost of the storage device has now been regarded as a pressing problem with respect to a measure against global warming.

In order to make the storage device consume less power, the most effective way is to stop rotation of a magnetic disk device (a data disk) in which data is stored as long as possible. It is concerned, however, that the stop of rotation of a magnetic disk device could degrade its performance in regard to a response time and a throughput. Therefore, various techniques according to the related art have been proposed so as to address the problem of maintaining performance of a magnetic disk device while saving its power consumption.

Some of the major techniques according to the related art are known as follows. In one of the techniques, if there are plural data disks, making use of the nature that accesses are not made uniformly to all of the data disks, a data which is frequently accessed is collected into a limited number of data disks. In another technique, if a data disk is in an idle state in which the data disk is rotating but is not performing a write processing or a read processing, the rotation speed of the data disk is kept low. In other technique, in addition to a main data disk in which an original data is stored, a cache disk for access in which a copy of the original data is stored is prepared. An appropriate cache algorithm is devised, to thereby reduce frequency of accesses to the data disk.

For example, Non-Patent Document 1 proposes a technique in which frequently-accessed data are aggregated in a small number of read-only cache disks, making use of locality of data accesses, and most other data disks are brought into a stop state as long as possible without making the data disks rotate.

RELATED ART DOCUMENT

Patent Document

Patent Document 1: Japanese Laid-Open Patent Application, Publication No. 2004-334739

Non-Patent Document

Non-Patent Document 1: Dennis Colarelli, Dirk Grunwald. Massive Arrays of Idle Disks For Storage Archives. Proc. 2002 Conf. High-Performance Networking and Computing, IEEE CS Press 2002

SUMMARY OF THE INVENTION

Problem to be Solved by the Invention

The method described in Non-Patent Document 1, however, focuses only on a cache of a data and not on reliability of a storage. Thus, if a failure such as a crash occurs for some reason in a main data disk in which data is stored in a storage device, it is not possible to deal with the failure because there is no copy of the data. If a disk on the backup side is added so as to enhance reliability, the storage device becomes larger in size, and manufacturing cost or power consumption is disadvantageously increased. As described above, the conventional techniques have a problem that, in an attempt to ensure power saving and performance, even if the power saving may be achieved, consideration is not given to reliability of data.

Another approach for the power saving is usage of a storage device which includes data disks each having a primary data area and a backup data area, without changing the number of the data disks of the storage device. In this case, it is assumed in the conventional technology, both a disk on the primary side and a disk on the backup side are constantly rotated. This means that a simple combination of a technique of saving power of a storage device with a technique of ensuring reliability thereof has not been possible.

In light of the problems as described above, the present invention has been made in an attempt to provide a storage device which includes a plurality of data disks each having a primary data area and a backup data area, and consumes less power while ensuring its performance and reliability.

Means for Solving the Problems

To solve the problems as described above, a storage device in accordance with a first aspect of the present invention includes: a plurality of data disks, each of which is made up of a disk whose storage area is logically divided into one primary data area and one or more backup data areas; and a system management unit that provides control of storing a data to be stored in one of the data disks in response to a write request, in the primary data area in the one of the data disks and also storing the data in a backup data area of at least one of the other data disks. The system management unit includes: a plurality of cache memories, each having a storage area logically divided into one primary data area and one or more backup data areas; a disk rotation state detection unit that detects whether the data disk is rotating at a normal rotation speed in a normal rotation state or in a normal rotation stop state in which the data disk is either rotating at a prescribed low rotation speed lower than the normal rotation speed or stopped; a disk rotation state control unit that switches a rotation state of the data disk between the normal rotation state and the normal rotation stop state; and a data placement control unit that controls each of the data disks in such a manner that the data disk is normally kept in the normal rotation stop state as long as possible and controls a data disk selected from among the plural data disks, in response to a write request or a read request, in such a manner that the disk rotation state control unit is set to switch the rotation state of the selected data disk to the normal rotation state, when the selected data disk is in the normal rotation stop state, and that, when the data disk is in the normal rotation state, performs a processing of transferring a write target data for which the write request has been made, to the selected data disk, or a processing of transferring a read target data for which the read request has been made, from the selected data disk. The data placement control unit: temporarily stores, in response to a write request, a data to be stored in one of the data disks, in a primary data area in the cache memory which has been associated with the data disk and also stores a backup data of the data in a backup data area in at least one of the other cache memories; if it is detected that the queue length in the cache memory after the data is stored is in a status of a memory capacity in which the memory capacity is larger than a prescribed first threshold: and also if the selected data disk is in the normal rotation state, then transfers the data to the data disk; or, also if the selected data disk is in the normal rotation stop state, then switches the rotation state of the selected data disk to the normal rotation state and transfers the data to the data disk; if it is detected that the queue length in the cache memory after the data is stored is in a status of a memory capacity in which the memory capacity is equal to or larger than a prescribed second threshold which is smaller than the first threshold: and also if the selected data disk is in the normal rotation state, then transfers the data to the data disk; or, also if the selected data disk is in the normal rotation stop state, then holds the data with no transferring; and, if it is detected that the queue length in the cache memory after the data is stored is in a status of a memory capacity in which the memory capacity is equal to or smaller than the prescribed second threshold, then holds the data with no transferring.

With the configuration described above, in the storage device, the two data disks for securing reliability are kept in the normal rotation stop state as long as possible, and, when a write request or a read request is made, the normal rotation stop state can be turned to the normal rotation state. The normal rotation stop state used herein means not only a stop state in which the data disk is completely stopped but also a low speed rotation state in which the data disk is rotating at a prescribed low rotation speed lower than the normal rotation speed. Also, with the configuration described above, in the storage device, as many data disks as possible are kept in the normal rotation stop state instead of constantly rotating disks on the primary side and on the backup side, which can save electric power. The storage device thus can save electric power while ensuring performance and reliability thereof.

Further, with the configuration described above, the storage device includes the cache memory that caches a data in the data disk, which can decrease frequency of access to the data disk. That is, in the storage device, as many data disks as possible can be kept in the normal rotation stop state, thus allowing electric power saving. Also, both the cache memory and the data disk are configured to hold respective primary data and backup data, which can further enhance reliability. For example, if electric power is supplied to the cache memory both on the primary side and the backup side, even when one of the sides crashes, data can be left undamaged.

In the storage device in accordance with a second aspect of the present invention, the data placement control unit: if a first data disk selected as a data disk on a primary side having a primary data area associated with a data as a write target data for which the write request has been made is in the normal rotation stop state, sequentially performs processings of: transferring a data stored in a primary data area in a first cache memory, to a primary data area in the first data disk; and transferring a data stored in a backup data area in a second cache disk associated with a backup data area in the first data disk, to the backup data area in the first data disk: and if a second data disk selected as a data disk to which a backup data in response to the write request is written is in the normal rotation state, sequentially performs processings of: transferring a data stored in a backup data area in the second cache memory in which the backup data is stored, to a backup data area in the second data disk; and transferring a data stored in a primary data area in a third cache disk associated with a primary data area in the second data disk, to the primary data area in the second data disk.

In the storage device in accordance with a third aspect of the present invention, the data placement control unit; when a read request is made, if there is not present a read target data for which the read request has been made, in a cache memory on a primary side or in a cache memory on a backup side, selects both a data disk on the primary side having a primary data area associated with the cache memory on the primary side and a data disk on the backup side having one or more backup data areas associated with the cache memory on the backup side; if either of the selected data disks is detected to be in the normal rotation stop state, preferentially accesses the data disk in the normal rotation state, and transfers the read target data from the data disk; and, when the read request is made, if both of the selected data disks on the primary side and on the backup side are detected to be in the normal rotation stop state, compares a total queue size of memory cache data in the cache memory on the primary with a total queue size of memory cache data in the cache memory on the backup side: and, if the total queue sizes are not the same, then makes the disk rotation state control unit spin up either of the data disks having the total queue size larger than the other, and accesses the data disk; and, if the total queue sizes are the same, makes the disk rotation state control unit spin up either of the data disks on the side which has a longer time period in the rotation stop state, accesses the data disk, and transfers the target read data from the data disk.

With the configuration described above, in the storage device, when a write request of a data is made, even if a data disk to which the data is to be written is in the normal rotation stop state, the data placement control unit makes the disk rotation state control unit spin up and rotate the data disk up to the normal rotation state, and then, accesses the data disk. Also, in the storage device, when a read request of a data is made, if either one of the two data disks in each of which a write target data is stored is in the normal rotation state, the data placement control unit accesses the data disk in the normal rotation state. If the both data disks are in the normal rotation stop state, the data placement control unit spins up and accesses only one of the two data disks. That is, the storage device can ensure a normal rotation stop state of one of the other data disk for a long period of time so as to ensure reliability.

Further, in a case where the both data disks are in the normal rotation stop state, such a criteria for selecting a data disk to be spun up is determined that a data disk staying in the rotation stop state longer than the other be selected. This can reduce numbers of times of starting a spinup and switching to the normal rotation stop state of the two disks from viewpoint of a sum total of those numbers in order to ensure reliability. That is, in the storage device, as many data disks as possible are kept in the normal rotation stop state, which can save electric power.

In the storage device, when a read request is made, a data disk on the primary side or on the backup side which is in the normal rotation stop state is spun up, and then, an appropriate data is read out from one data area, either a primary data area or a backup data area. The spun-up data disk is thus kept in the normal rotation state for a prescribed time period, during which, even if another read or write request is made to the one data area, it is not necessary to spin up the data disk. Moreover, even if other read or write request is made to the other data area, it is also not necessary to spin up the data disk.

The storage device in accordance with a fourth aspect of the present invention further includes a cache disk which is a read only disk storing therein a data which is a copy of an original data stored in the data disk. The data placement control unit copies the original data stored in the data disk, stores the copied data in the cache disk, and, when a read request is made, reads out a data as a read target data for which the read request has been made, preferentially from the cache disk rather than the data disk.

With the configuration described above, the storage device includes the cache disk which is a read-only disk. If data stored in each of the data disks and accessed frequently is aggregated to the cache disk, frequency of access to the data disk can be decreased. That is, in the storage device, as many data disks as possible can be kept in the normal rotation stop state, which can save electric power.

Further, to solve the problems as described above, a control method for a storage device is provided. In the control method, the storage device includes: a plurality of data disks, each of which is made up of a disk whose storage area is logically divided into one primary data area and one or more backup data areas; a plurality of cache memories, each having a memory logically divided into one primary data area and one or more backup data areas; and a system management unit which places and manages data in the data disk and the cache memory according to a rotation state of the data disk, a status of a memory capacity of the cache memory, and a write request or a read request from outside. The control method is performed by the system management unit when a write request is made, and includes: a primary data processing in which, a data of interest is written, as a primary data, to a data disk on a primary side having a primary data area associated with the data of interest for which the write request has been made; and a backup data processing in which the data of interest is written, as a backup data, to a data disk on a backup side having a backup data area associated with the data of interest. The control method at the primary data processing includes: a step of temporarily storing a data for which the write request has been made, in a primary data area in a first cache memory associated with a first data disk which is a data disk on the primary side; a step of determining such conditions are satisfied that a queue length in the cache memory after the data is stored is in a status of a memory capacity in which the memory capacity is equal to or larger than a prescribed second threshold which is smaller than a prescribed first threshold, and at the same time, that the first data disk is in the normal rotation state; a step of determining whether the first data disk is rotating at a normal rotation speed in a normal rotation state or in a normal rotation stop state in which the first data disk is either rotating at a prescribed low rotation speed lower than the normal rotation speed or stopped, if such a condition is satisfied that the queue length in the cache memory after the data is stored is in a status of a memory capacity in which the memory capacity is larger than the first threshold; a step of switching the rotation state of the first data disk to the normal rotation state, if the queue length is larger than the first threshold, and at the same time, if the rotation state thereof is the normal rotation stop state; and a primary side write step of writing the data to the first data disk, if any of the conditions is satisfied, and at the same time, if the rotation state of the first data disk is the normal rotation state. The primary side write step includes: a step of storing a data stored in a primary data area in the first cache memory, in a primary data area in the first data disk; and a step of storing a data stored in a backup data area in a second cache memory in which a data associated with a backup data area in the first data disk, in the backup data area in the first data disk. The control method at the backup data processing includes: a step of temporarily storing a data for which the write request has been made as a backup of a data stored in the primary data area in the first cache memory, in a backup data area in a third cache memory; a step of determining such conditions are satisfied that a queue length in the third cache memory after the data is stored is in a status of a memory capacity in which the memory capacity is equal to or larger than a prescribed fourth threshold which is smaller than a prescribed third threshold, and at the same time, that a second data disk associated with the first data disk as a backup thereof is in the normal rotation state; a step of determining whether a rotation state of the second data disk associated with the first data disk as a backup thereof is either the normal rotation state or the normal rotation stop state, if such a condition is satisfied that the queue length in the third cache memory after the data is stored is in a status of a memory capacity in which the memory capacity is larger than the third threshold; a step of switching the rotation state of the second data disk to the normal rotation state, if the queue length is larger than the third threshold, and at the same time, if the rotation state thereof is the normal rotation stop state; and a backup side write step of writing a data to the second data disk, if any of the conditions is satisfied, and at the same time, if the rotation state of the second data disk is the normal rotation state. The backup side write step includes: a step of storing a data stored in a backup data area in the third cache memory, in a backup data area in the second data disk; and a step of storing a data stored in a primary data area in a fourth cache memory in which a data associated with a primary data area in the second data disk is stored, in the primary data area in the second data disk.

With the procedure as described above, the control method for a storage device in accordance with the fifth aspect of the present invention is performed including the primary data processing and the backup data processing, by the system management unit, when a write request is made. This can enhance reliability. In the primary data processing, a step of temporarily caching a data to be stored in a primary data area in a data disk, in a cache memory and then storing the data in the data disk is performed by the system management unit. Herein, during the time during which the data is cached in the cache memory, the data disk can be kept in the normal rotation stop state. Also, during the time during which the step of storing the data from the cache memory into the data disk is performed, the data disk is in the normal rotation state. In the primary data processing performed by the system management unit, during the normal rotation state of the data disk, a data associated with a backup data area in the data disk in the normal rotation state is updated immediately after the storing step. That is, the system management unit stores a data stored in a backup data area in a cache memory in which the data associated with the backup data area in the data disk is stored, in a backup data area of the data disk. In a case where the data associated with the backup data area is updated, compared to a case where the data disk in the normal rotation stop state is updated, power consumption can be decreased, because it is not necessary to spin up the data disk.

Also, with the procedure as described above, in the backup data processing, a step of temporarily caching a backup of the data stored in the primary data area in a data disk, in the cache memory and then storing the backup data in the data disk is performed by the system management unit. In the backup data processing performed by the system management unit, during the normal rotation state of the data disk, a data associated with a primary data area in the data disk in the normal rotation state is also updated immediately after the above storing step. That is, also in the backup data processing, the two data areas are successively updated during the normal rotation state of the data disk, which can also decrease power consumption similarly to the primary data processing.

A control method of a storage device in accordance with a sixth aspect of the present invention is provided. In the control method, the storage device includes: a plurality of data disks, each of which is made up of a disk whose storage area is logically divided into one primary data area and one or more backup data areas; a plurality of cache memories, each having a memory logically divided into one primary data area and one or more backup data areas; a cache disk which is a read only disk storing therein a data which is a copy of an original data stored in the data disk; and a system management unit which places and manages data in the data disk, the cache memory, and the cache disk according to a rotation state of the data disk, a status of a memory capacity of the cache memory, and a write request or a read request from outside. The control method is performed by the system management unit when a write request is made and includes: a primary data processing in which the data is written, as a primary data, to a data disk on a primary side having a primary data area associated with a data for which the write request has been made; and a backup data processing in which the data is written, as a backup data, to a data disk on a backup side having backup data area associated with the data. The control method at the primary data processing includes: a step of temporarily storing a data for which the write request has been made, in a primary data area in a first cache memory associated with a first data disk which is a data disk on the primary side; a step of determining such conditions are satisfied that a queue length in the cache memory after the data is stored is in a status of a memory capacity in which the memory capacity is equal to or larger than a prescribed second threshold which is smaller than a prescribed first threshold, and at the same time, that the first data disk is in the normal rotation state; a step of determining whether the first data disk is rotating at a normal rotation speed in a normal rotation state or in a normal rotation stop state in which the first data disk is either rotating at a prescribed low rotation speed lower than the normal rotation speed or stopped, if such a condition is satisfied that the queue length in the cache memory after the data is stored is in a status of a memory capacity in which the memory capacity is larger than the first threshold; a step of switching the rotation state of the first data disk to the normal rotation state, if the queue length is larger than the first threshold, and at the same time, if the rotation state thereof is the normal rotation stop state; and a primary side write step of writing the data to the first data disk, if any of the conditions is satisfied, and at the same time, if the rotation state of the first data disk is the normal rotation state. The primary side write step includes: a step of storing a data stored in a primary data area in the first cache memory, in a primary data area in the first data disk; and a step of storing a data stored in a backup data area in a second cache memory in which a data associated with a backup data area in the first data disk, in the backup data area in the first data disk. The control method at the backup data processing, includes: a step of temporarily storing a data for which the write request has been made as a backup of a data stored in the primary data area in the first cache memory, in a backup data area in a third cache memory; a step of determining such conditions are satisfied that a queue length in the third cache memory after the data is stored is in a status of a memory capacity in which the memory capacity is equal to or larger than a prescribed fourth threshold which is smaller than a prescribed third threshold, and at the same time, that a second data disk associated with the first data disk as a backup thereof is in the normal rotation state; a step of determining whether a rotation state of the second data disk associated with the first data disk as a backup thereof is either the normal rotation state or the normal rotation stop state, if such a condition is satisfied that the queue length in the third cache memory after the data is stored is in a status of a memory capacity in which the memory capacity is larger than the third threshold; a step of switching the rotation state of the second data disk to the normal rotation state, if the queue length is larger than the third threshold, and at the same time, if the rotation state thereof is the normal rotation stop state; and a backup side write step of writing a data to the second data disk, if any of the conditions is satisfied, and at the same time, if the rotation state of the second data disk is the normal rotation state. The backup side write step includes: a step of storing a data stored in a backup data area in the third cache memory, in a backup data area in the second data disk; and a step of storing a data stored in a primary data area in a fourth cache memory in which a data associated with a primary data area in the second data disk is stored, in the primary data area in the second data disk.

With the procedure as described above, the control method for a storage device in accordance with the sixth aspect of the present invention can have advantageous effects similar to those of the control method for a storage device in accordance with the fifth aspect of the present invention. Further, in the control method described above, the step of storing a copy of a data of interest in the cache disk, during the time during which the data disk is in the normal rotation state. This can prevent unnecessarily rotation operations of the data disk. Thus, the read processing can be stably performed by the cache disk, and the data disk can be kept in the normal rotation stop state for a longer period of time.

A control method of a storage device in accordance with a seventh aspect of the present invention is provided. In the control method, the storage device includes: a plurality of data disks, each of which is made up of a disk whose storage area is logically divided into one primary data area and one or more backup data areas; a plurality of cache memories, each having a memory logically divided into one primary data area and one or more backup data areas; and a system management unit which places and manages data in the data disk and the cache memory according to a rotation state of the data disk, a status of a memory capacity of the cache memory, and a write request or a read request from outside. The control method is performed by the system management unit when a read request is made and includes: a step of determining whether or not a read target data for which the read request has been made is present in a primary data area in a fifth cache memory associated with the data; a step of determining, if the data is not present in the primary data area in the fifth cache memory, whether or not the data is present in a backup data area in a sixth cache memory, as a backup of the data stored in the primary data area in the fifth cache memory; a step of determining, if the data is not present in the backup data area in the sixth cache memory, whether or not both a data disk on the primary side associated with the data stored in the primary data area in the fifth cache memory, and a data disk on the backup side corresponding to the data stored in the backup data area in the sixth cache memory are each rotating in a normal rotation stop state in which the data disk is either rotating at a prescribed low rotation speed lower than a normal rotation speed, or stopped; a step of comparing a total queue size of memory cache data in the fifth cache memory with a total queue size of memory cache data in a sixth cache memory, if both the data disk on the primary side and the data disk on the backup side are in the normal rotation stop state; a step of, if the total queue sizes are not the same, spinning up either of the data disks having the total queue size larger than the other, up to a normal rotation state in which the data disk is rotating at the normal rotation speed, and reading out the data from the data disk; a step of, if the total queue sizes are the same, spinning up either one of the data disks that stays in the rotation stop state longer than the other, up to the normal rotation state, and reading out the data from the data disk; and a step of reading out, if either of the data disk on the primary side or the data disk on the backup side is in the normal rotation stop state, the data from the data disk in the normal rotation state.

With the procedure as described above, in the control method for a storage device in accordance with the seventh aspect of the present invention, when a read request is made, a candidate storage place in which a data for which the read request is made is stored is sequentially searched by the system management unit. That is, the primary data area in the cache memory is the top priority to be searched as the candidate storage place by the system management unit. After that, the backup data area in the cache memory as a backup thereof is searched. Only when the target read data has not been read in the above-described steps, the system management unit accesses the data disk. The data disk can be kept in the normal rotation stop state until those steps are completed. Also, when the system management unit accesses the data disk, if at least either one of the primary side or the backup side of the data disk is in the normal rotation stop state, the data disk on a side to which the access is not made can be still kept in the normal rotation stop state. That is, in the control method for the storage device, such control is provided that the data disk both on the primary side and the backup side is kept in the normal rotation stop state as long as possible. And, only when it is absolutely necessary, the data disk on the primary side or on the backup side is spun up to rotate in the normal rotation state. This can realize a drastic saving of power consumption.

A control method of a storage device in accordance with an eighth aspect of the present invention is provided. In the control method, the storage device includes: a plurality of data disks, each of which is made up of a disk whose storage area is logically divided into one primary data area and one or more backup data areas; a plurality of cache memories, each having a memory logically divided into one primary data area and one or more backup data areas; a cache disk which is a read only disk stored therein a data which is a copy of an original data storing in the data disk; and a system management unit which places and manages data in the data disk, the cache memory, and the cache disk according to a rotation state of the data disk, a status of a memory capacity of the cache memory, and a write request or a read request from outside. The control method performed by the system management unit when a read request is made and includes: a step of determining whether or not a read target data for which the read request has been made is present in a primary data area in a fifth cache memory associated with the data; a step of determining, if the data is not present in the primary data area in the fifth cache memory, whether or not the data is present in a backup data area in a sixth cache memory, as a backup of the data stored in the primary data area in the fifth cache memory; a step of determining, if the data is not present in the backup data area in the sixth cache memory, whether or not the data is present in the cache disk; a step of determining, if the data is not present in the cache disk, whether or not both a data disk on the primary side associated with the data stored in the primary data area in the fifth cache memory, and a data disk on the backup side corresponding to the data stored in the backup data area in the sixth cache memory are each rotating at a normal rotation speed in a normal rotation state or in a normal rotation stop state in which the data disks are either rotating at a prescribed low rotation speed lower than the normal rotation speed, or stopped; a step of comparing a total queue size of memory cache data in the fifth cache memory with a total queue size of memory cache data in a sixth cache memory, if both the data disk on the primary side and the data disk on the backup side are in the normal rotation stop state; a step of, if the total queue sizes are not the same, spinning up either of the data disks having the total queue size larger than the other, up to a normal rotation state in which the data disk is rotating at the normal rotation speed, and reading out the data from the data disk; a step of, if the total queue sizes are the same, spinning up either one of the data disks that stays in the rotation stop state longer than the other, spinning up and rotating the determined data disk up to the normal rotation state, and reading out the data from the data disk; and a step of reading out, if either of the data disk on the primary side or the data disk on the backup side is in the normal rotation stop state, the data from the data disk in the normal rotation state.

With the procedure as described above, the control method for a storage device in accordance with the eighth aspect of the present invention can have advantageous effects similar to those of the control method for a storage device in accordance with the seventh aspect of the present invention. Further, when a read request is made and a candidate storage place in which a data for which the read request is made is stored is sequentially searched, the cache disk is preferentially searched, rather than the data disk cache disk. A hit in the cache disk allows the data disk to be kept in the normal rotation stop state for a longer time period.

A system management program in accordance with a ninth aspect of the present invention is provided. The system management program causes a computer serving as a storage device to function as below. The storage device includes: a plurality of data disks, each of which is made up of a disk whose storage area is logically divided into one primary data area and one or more backup data areas, and a plurality of cache memories, each having a storage area logically divided into one primary data area and one or more backup data areas; and provides control of storing a data to be stored in one of the data disks in response to a write request, in a primary data area in the one of the data disks and also storing the data in a backup data area of at least one of the other data disks. The program causes the computer as the storage device to function as: a cache memory capacity detection unit that detects a current queue length in the cache memory and also detects a status of a current memory capacity by comparing the detected queue length with a prescribed threshold for classifying a memory capacity into statuses; a disk rotation state detection unit that detects whether the data disk is rotating at a normal rotation speed in a normal rotation state or in a normal rotation stop state in which the data disk is either rotating at a prescribed low rotation speed lower than the normal rotation speed or stopped; a disk rotation state control unit that switches a rotation state of the data disk between the normal rotation state and the normal rotation stop state; and a data placement control unit that controls each of the data disks in such a manner that the data disk is normally kept in the normal rotation stop state as long as possible and controls a data disk selected from among the plural data disks, in response to a write request or a read request, in such a manner that the disk rotation state control unit is set to switch the rotation state of the selected data disk to the normal rotation state, when the selected data disk is in the normal rotation stop state, and that, when the data disk is in the normal rotation state, performs a processing of transferring a write target data for which the write request has been made, to the selected data disk, or a processing of transferring a read target data for which the read request has been made, from the selected data disk. The data placement control unit: temporarily stores, in response to a write request, a data to be stored in one of the data disks, in a primary data area in the cache memory which has been associated with the data disk and also stores a backup data of the data in a backup data area in at least one of the other cache memories; if it is detected that the queue length in the cache memory after the data is stored is in a status of a memory capacity in which the memory capacity is larger than a prescribed first threshold: and also if the selected data disk is in the normal rotation state, then transfers the data to the data disk; or, also if the selected data disk is in the normal rotation stop state, then switches the rotation state of the selected data disk to the normal rotation state and transfers the data to the data disk; if it is detected that the queue length in the cache memory after the data is stored is in a status of a memory capacity in which the memory capacity is equal to or larger than a prescribed second threshold which is smaller than the first threshold: and also if the selected data disk is in the normal rotation state, then transfers the data to the data disk; or, also if the selected data disk is in the normal rotation stop state, then holds the data with no transferring; and, if it is detected that the queue length in the cache memory after the data is stored is in a status of a memory capacity in which the memory capacity is equal to or smaller than the prescribed second threshold, then holds the data with no transferring. With the configuration as described above, the computer with the program installed thereon can realize respective functions based on the program.

Advantageous Effects of Invention

With the storage device in accordance with the first aspect of the present invention, both a data disk on the primary side and a data disk on the backup side related to a data of interest can be kept in the normal rotation stop state as long as possible. When a write request or a read request is made, the data disk can be returned to the normal rotation state. That is, the storage device makes as many data disks as possible keep in the normal rotation stop state, which can save power consumption while ensuring performance and reliability. Further, a computer served as the storage device with the system management program in accordance with the ninth aspect of the present invention installed therein can have advantageous effects similar to those of the storage device in accordance with the first aspect thereof.

Further, with the storage device in accordance with the first aspect of the present invention, the storage device includes the cache memory in addition to the data disk. This can contribute to a stable write processing and can reduce access frequency to the data disk. Thus, the storage device can make as many data disks as possible keep in the normal rotation stop state, which can save power consumption. Also, both the cache memory and the data disk are configured to hold the primary data and the backup data, which can save power consumption while ensuring performance and reliability.

With the storage device in accordance with the second or the third aspect of the present invention, either one of the data disk on the primary side and the data disk on the backup side related to a data of interest can be kept in the normal rotation stop state for a long period of time, and the numbers of times of starting a spinup and switching to a rotation stop of each of the data disks can be reduced. Thus, the storage device can make as many data disks as possible keep in the normal rotation stop state, which can save power consumption while ensuring performance and reliability.

With the storage device in accordance with the fourth aspect of the present invention, the storage device includes the read-only cache disk in addition to the data disk. This can contribute to a stable write processing and can reduce access frequency to the data disk. Thus, the storage device can make as many data disks as possible keep in the normal rotation stop state, which can save power consumption.

With the control method for a storage device in accordance with the fifth or sixth aspect of the present invention, when a write request is made, both the primary data processing and the backup data processing are performed by the system management unit. This makes it possible to updates a primary side data area and a backup side data area of the data disk in the both processings during the normal rotation state of the data disk, while ensuring reliability. Thus, in the primary data processing or the backup data processing, power consumption can be reduced, compared to a case where either one of the data areas is updated during the normal rotation state of the data disk.

With the control method for the storage device in accordance with the seventh or eighth aspect of the present invention, when a read request is made, the determination steps are performed in the order in which the data disk is accessed as few as possible by the system management unit. Also, even when an access is made to the data disk, if at least either one of the data disk on the primary side or the data disk on the backup side is in the normal rotation stop state, the data disk having not been accessed can be kept in the normal rotation stop state. Therefore, a drastic saving of power consumption can be realized.

BRIEF DESCRIPTION OF THE DRAWINGS

FIG. 4A illustrates an entire flow of the processing and FIG. 4B illustrates a $D_{Primary}$ write processing.

FIG. 5A illustrates an entire flow of the processing and FIG. 5B illustrates a $D_{Backup}$ write processing.

FIG. 10A illustrates a write processing from a cache memory to a data disk. FIG. 10B illustrates a write processing from the data disk to a cache disk.

EMBODIMENT FOR CARRYING OUT THE INVENTION

Next is described in detail an embodiment of the present invention for realizing a storage device and a method of controlling the storage device with reference to related drawings. For convenience of explanation, the embodiment is described below in the following chapters in this order: 1. Outline of basic configuration of storage device; 2. Outline of configuration for stable data write; 3. Outline of configuration for stable data read; 4. Operations of storage device if cache unit is one; and 5. Operations of storage device if cache unit is more than one.

[1. Outline of Basic Configuration of Storage Device]

Figure 1:
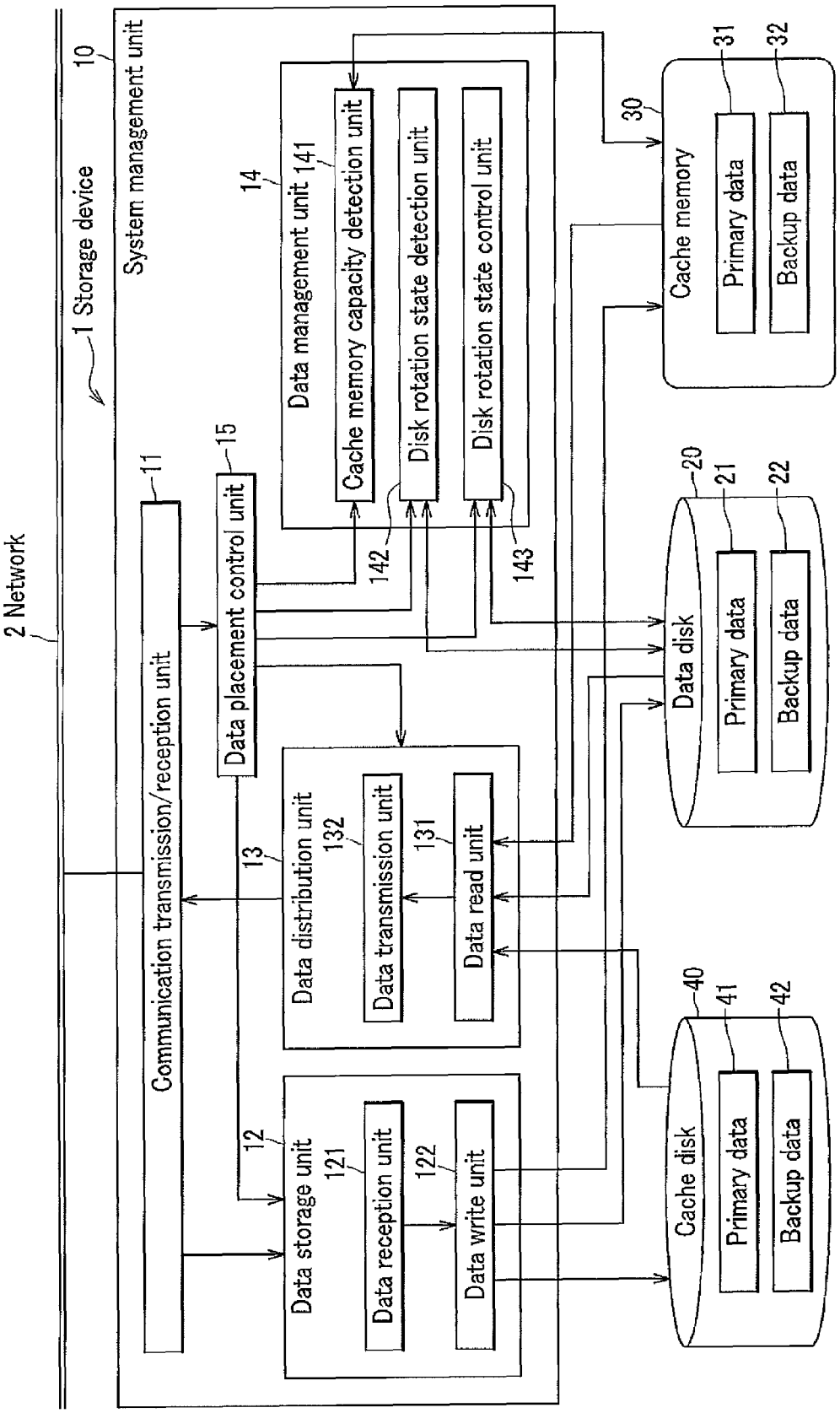
FIG. 1 is a block diagram schematically illustrating a configuration of a storage device according to an embodiment of the present invention.

The storage device 1 according to an embodiment of the present invention includes, as shown in FIG. 1, a system management unit 10 and a data disk 20 as main components. The storage device 1 further includes a cache memory 30 so as to stably perform a write processing and a cache disk 40 so as to stably perform a read processing. Next is described a relation between the system management unit 10 and the data disk 20 as the main components.

The system management unit 10 is configured by, for example: a computer including a processing device such as a CPU (Central Processing Unit), a storage device such as a memory and a hard disk, and an interface device performing transmission and reception of various information to and from outside; and a program installed in the computer. The system management unit 10 is realized by controlling hardware resources as described above by a program with coordination between a hardware device and software. As shown in FIG. 1, the system management unit 10 herein is configured to include a communication transmission/reception unit 11, a data storage unit 12, a data distribution unit 13, a data management unit 14, and a data placement control unit 15.

The communication transmission/reception unit 11 transmits and receives data to and from a client computer not shown via a network 2. The communication transmission/reception unit 11 is, for example, a communication board which transmits and receives data using communication protocol of TCP/IP (Transmission Control Protocol/Internet Protocol).

The communication transmission/reception unit 11 also includes an input/output interface which inputs and outputs data into and from the data disk 20, the cache memory 30, and the cache disk 40 of the storage device 1. Note that each of the data disk 20, the cache memory 30, and the cache disk 40 may also be simply referred to as a storage unit if it is not particularly necessary to distinguish one from another.

The data storage unit 12 stores a data received from outside via the communication transmission/reception unit 11 or a data inputted from the storage unit of the storage device 1 via the communication transmission/reception unit 11, in a prescribed storage unit of the storage device 1. The data storage unit 12 herein includes a data reception unit 121 and a data write unit 122.

The data reception unit 121 receives a data via the communication transmission/reception unit 11. The data reception unit 121 receives a data from a source of the data notified by the data placement control unit 15 (for example, a client computer not shown) via the communication transmission/reception unit 11. The data received by the data reception unit 121 is outputted to the data write unit 122.

The data write unit 122 writes the data received by the data reception unit 121, to a write address in a storage unit specified by the data placement control unit 15.

The data distribution unit 13 transmits the data stored in the storage unit to a requestor which has made a request for the data (for example, a client computer not shown) via the communication transmission/reception unit 11. The data distribution unit 13 herein includes a data read unit 131 and a data transmission unit 132.

The data read unit 131 reads out a data specified by the data placement control unit 15 from the storage unit and outputs the data to the data transmission unit 132. It is herein assumed that the data placement control unit 15 also notifies the data read unit 131 of an address or the like for identifying the data.

The data transmission unit 132 transmits the data read out by the data read unit 131 to a client computer, not shown, notified by the data placement control unit 15 or to other storage unit also notified by the data placement control unit 15, via the communication transmission/reception unit 11.

The data management unit 14 serves for managing a data stored in the storage unit in the storage device 1. The data management unit 14 is herein configured to include a cache memory capacity detection unit 141, a disk rotation state detection unit 142, and a disk rotation state control unit 143. The cache memory capacity detection unit 141, the disk rotation state detection unit 142, and the disk rotation state control unit 143 are to be described in detail hereinafter.

The data placement control unit 15 controls the data storage unit 12, the data distribution unit 13, and the data management unit 14, manages a data to be stored in each of the storage units in the storage device 1, and determines placement of the data. The data placement control unit 15 is to be described in detail hereinafter.

The data disk 20 is configured by, for example, a generally-available magnetic disk device, an optical disk device, a magneto optical disk drive, or the like. A storage area of the data disk 20 is logically divided into a primary data area and a backup data area. The primary data area and the backup data area of the data disk 20 are also referred to as a primary layer and a backup layer, respectively. In the example shown in FIG. 1, the data disk 20 stores therein a primary data 21 as a primary layer data and a backup data 22 as a backup layer data.

In FIG. 1, only one unit of the data disk 20 is exemplified. Actually, however, the storage device 1 has a plurality of the data disks 20. Combinations of the storage units as main parts of the storage device 1 are exemplified in FIG. 2 and FIG. 8, though details are to be described later.

Figure 2:
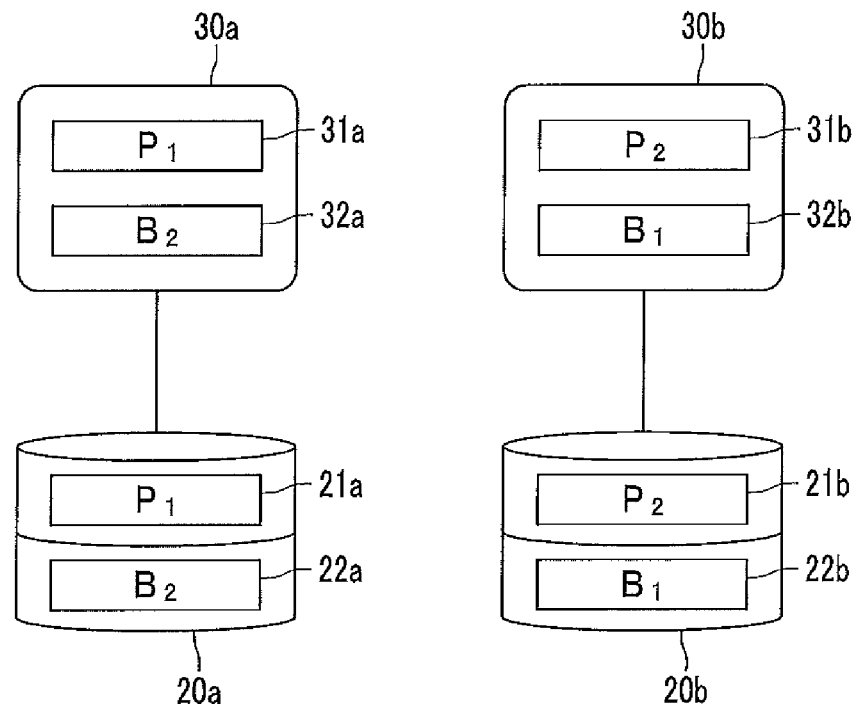
FIG. 2 is an explanatory diagram schematically illustrating the storage device of FIG. 1 in a case where a cache memory which is a unit of data in the data disk stored in the cache memory is one, according to the embodiment.

It is assumed herein that the system management unit 10 provides control of storing a data to be stored in one of the plural data disks 20, in a primary data area of the one of the data disks 20 in response to a write request from outside and of also storing the data in a backup data area of at least one of the other data disks 20. For example, as shown in FIG. 2, let the storage device 1 be equipped with data disks 20a, 20b. The data disk 20a has a primary data area 21a and a backup data area 22a. The data disk 20b has a primary data area 21b and a backup data area 22b. It is assumed herein that a data for which a write request or a read request is made has been previously associated with either of the data disks 20a, 20b.

In this case, in writing a data, let the system management unit 10 store the data in the primary data area 21a of the data disk 20a. The stored data is referred to as a primary data or a data $P_1$. A data disk which has a primary data area associated with the data $P_1$ is herein referred to as a data disk $D_{primary}$ on a primary side.

When the system management unit 10 stores the data $P_1$, the system management unit 10 also stores a data having contents identical to those of the data $P_1$, in the backup data area 22b of the data disk 20b. The stored data is herein referred to as a backup data or a data $B_1$. A data disk which has a backup data area associated with the data $B_1$ is herein referred to as a data disk $D_{backup}$ on a backup side.

That is, in FIG. 2, if focusing on the data $P_1$ (=the data $B_1$), the data disk on the primary side $D_{primary}$ corresponds to the data disk 20a. The data disk on the backup side $D_{backup}$ corresponds to the data disk 20b.

Further, also in the example of FIG. 2, in writing another data, let the system management unit 10 store the data in the primary data area 21b of the data disk 20b. The stored data is herein referred to as a primary data or a data $P_2$. When the system management unit 10 stores the data $P_2$, the system management unit 10 also stores a data having contents identical to those of the data $P_2$ in the backup data area 22a of the data disk 20a. The stored data is herein referred to as a backup data or a data $B_2$. That is, in FIG. 2, if focusing on the data $P_2$ (=the data $B_2$), the data disk on the primary side $D_{primary}$ corresponds to the data disk 20b. The data disk on the backup side $D_{backup}$ corresponds to the data disk 20a.

The storage device 1 provides such control that the system management unit 10 makes a data disk on the primary side $D_{primary}$ and a data disk on the backup side $D_{backup}$ inactive as far as possible under normal conditions and, only when it is absolutely necessary, makes the data disk on the primary side $D_{primary}$ or the data disk on the backup side $D_{backup}$ spin up for purpose of saving power consumption of the storage device 1 while ensuring performance and reliability thereof.

The system management unit 10 includes a disk rotation state detection unit 142, a disk rotation state control unit 143, and a data placement control unit 15, as shown in FIG. 1 in order to keep the data disk 20 as inactive as possible.

The disk rotation state detection unit 142 detects, under control of the data placement control unit 15, whether a rotation state of the data disk 20 is a normal rotation state or a normal rotation stop state.

The normal rotation state used herein means a state in which the data disk 20 rotates at a predetermined normal rotation speed. The normal rotation speed used herein means the number of disk rotations at the time when an access is made thereto for a write or a read processing. The normal rotation speed is, for example, 7200 [rpm], 10000 [rpm], 15000 [rpm], or the like. The normal rotation speed can be changed as appropriate according to various factors such as, for example, a speed of access, power consumption, and noise.

The normal rotation stop state used herein means either a low speed rotation state in which rotation is performed at a prescribed low rotation speed lower than the normal rotation speed, or a rotation stop state. To simplify description, the normal rotation stop state is assumed to be a rotation stop state hereinafter.

The disk rotation state control unit 143 switches a rotation state of the data disk 20 between the normal rotation state and the rotation stop state (the normal rotation stop state) under control of the data placement control unit 15.

The data placement control unit 15 manages information concerning association between the data disks 20 and a data to be stored in one of the data disks 20, in a database not shown and controls the disk rotation state detection unit 142 and the disk rotation state control unit 143.

The data placement control unit 15 performs processings of: searching, in response to a write request or a read request, a plurality of the data disks 20 for a data disk on the primary side $D_{primary}$ and a data disk on the backup side $D_{backup}$ which are associated with a data for which the write request or the read request has been made; making access to each of the searched data disks $D_{primary}$ and $D_{backup}$; and transferring the data according to the write request or the read request.

When the write request is made, if the disk rotation state detection unit 142 detects that the data disk on the primary side $D_{primary}$ or the data disk on the backup side $D_{backup}$ is in the rotation stop state, the data placement control unit 15 makes the disk rotation state control unit 143 spin up the data disk detected to be in the rotation stop state and rotate the data disk up to the normal rotation state, and then, accesses the data disk.

When the read request is made, if the disk rotation state detection unit 142 detects that the data disk on the primary side $D_{primary}$ or the data disk on the backup side $D_{backup}$ is in the rotation stop state, the data placement control unit 15 preferentially accesses the data disk detected to be in the normal rotation state.

Further, when the read request is made, if the disk rotation state detection unit 142 detects that both the data disk on the primary side $D_{primary}$ and the data disk on the backup side $D_{backup}$ are in the rotation stop state, the data placement control unit 15 makes the disk rotation state control unit 143 spin up either one of the data disks staying in the rotation stop state longer than the other and rotate the data disk up to the normal rotation state, and then, accesses the data disk.

[2. Outline of Configuration for Stable Data Write]

The storage device 1 shown in FIG. 1 includes the cache memory 30 that caches a data stored in the data disk 20 so as to stably perform a read processing. Next is described a relation between the system management unit 10, the data disk 20, and the cache memory 30.

The cache memory 30 is configured by, for example, a generally-available semiconductor memory, a constantly-rotating disk, a SSD (Solid State Drive), or the like. The cache memory 30 may be a volatile memory or a non-volatile memory. If the cache memory 30 is configured by a volatile memory, a backup power source is used. The cache memory 30 has a memory which is logically divided into a primary data area and a backup data area. This ensures reliability of the cache memory 30 even if the cache memory 30 is configured by a volatile memory. In an example as shown in FIG. 1, the cache memory 30 stores therein a primary data 31 and a backup data 32.

Figure 8:
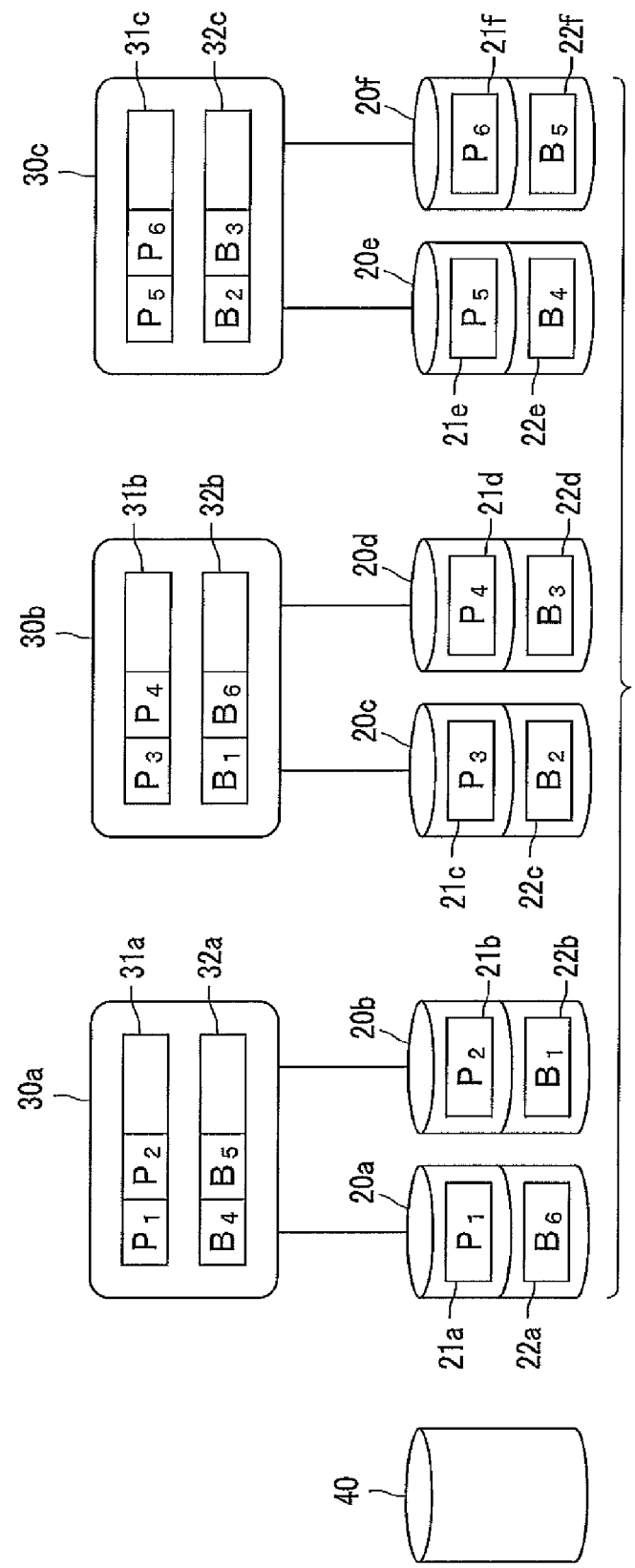
FIG. 8 is an explanatory diagram schematically illustrating the storage device of FIG. 1 in a case where the cache unit which is a unit of data in the data disk stored in the cache memory is more than one, according to the embodiment.

In FIG. 1, only one cache memory 30 is exemplified, however, the storage device 1 may include a plurality of the cache memories 30 (see FIG. 2 and FIG. 8). The number of the cache memories 30 can be changed where necessary. For example, if a cache unit which is a unit of data in the data disk 20 stored in the cache memory 30 is one, the number of the cache memories 30 is the same as that of the data disks 20 as shown in FIG. 2. If the cache unit is more than one, the number of the cache memories 30 is smaller than that of the data disks 20. For example, if the cache unit is "2", the number of the cache memories 30 is a half of that of the data disks 20 as shown in FIG. 8. A configuration of a storage device shown in FIG. 8 is to be described in detail hereinafter.

The data placement control unit 15 controls each of the data disks 20 and also manages information on association between each of the cache memories 30 and a data to be stored in the cache memory 30 or the like, using a database not shown.

The data placement control unit 15 temporarily stores a data to be stored in one of the plural data disks 20, in response to a write request from outside, in a primary data area in the cache memory 30 which has been associated with the one of the data disks 20, and also stores the data in a backup data area of at least one of the other cache memories 30.

As described above, at the time when the data placement control unit 15 writes the data to those cache memories 30, the data distribution unit 13 returns a response. This allows a high-speed response to an access request, and furthermore, a reduction in frequency of disk accesses. Thus, a time period during which rotation of the data disk 20 is stopped can be secured, and the number of times of rotation starts can be kept low.

For example, let the storage device 1 include cache memories 30*a*, 30*b* as shown in FIG. 2. The cache memory 30*a* herein includes a primary data area 31*a* and a backup data area 32*a*, and the cache memory 30*b* includes a primary data area 31*b* and a backup data area 32*b*. It is assumed that a data for which a write request or a read request is made has been previously associated with either of the cache memories 30*a*, 30*b*. The data placement control unit 15 shown in FIG. 1 provides control of writing a data from outside to the cache memory 30.

Figure 9:
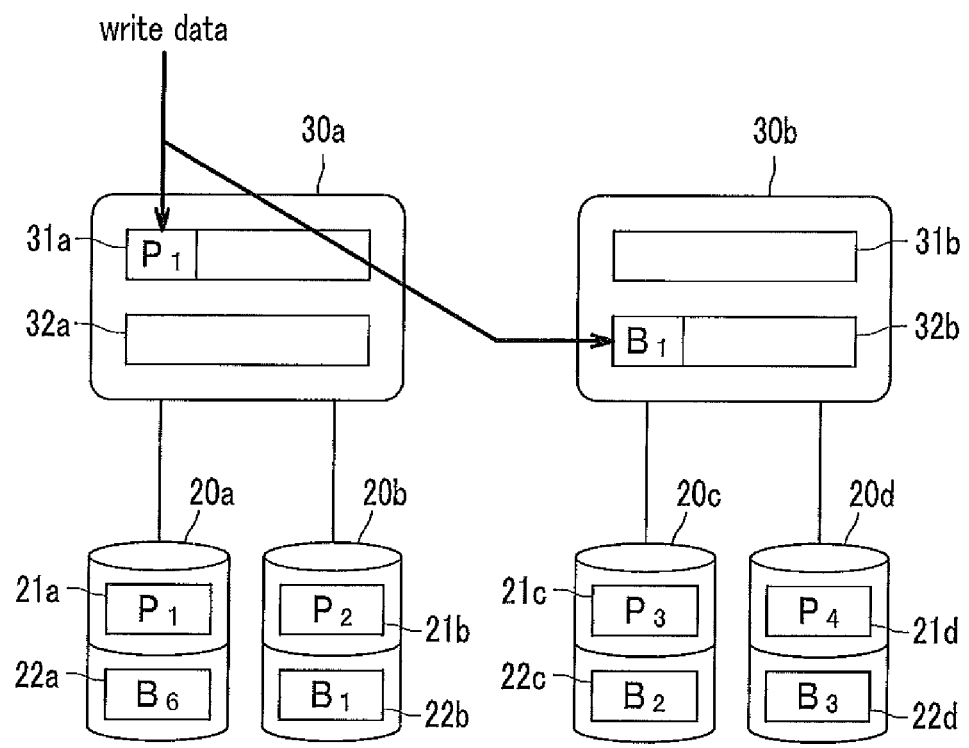
FIG. 9 is an explanatory diagram schematically illustrating a processing of writing a data received from a network to a cache memory in the storage device of FIG. 8 according to the embodiment.

If, for example, a write request for a write data is made from outside as shown in FIG. 9, the data placement control unit 15 performs a processing of storing the write data as a data $P_1$ in the primary data area 31*a* in the cache memory 30*a* and also a processing of storing the write data as a data $B_1$ (=the data $P_1$) in the backup data area 32*b* in the cache memory 30*b*. That is, the data placement control unit 15 utilizes a technique of nWAL (Neighboring Write Ahead Log) in writing a data in the cache memory 30. Note that the $P_1$ stored in the cache memory 30*a* is, for example, a small portion of the $P_1$ stored in the data disk 20*a*, a data whose contents are newly rewritten, or the like.

Of a series of the write processings performed when a write request of a write data is made, a processing of storing the data $P_1$ in the data disk 20*a* on the primary side is referred to as a primary processing. Meanwhile, a processing of storing the data $B_1$ as a backup data of the data $P_1$, in the data disk 20*b* on the backup side is referred to as a backup processing.

In the example shown in FIG. 2, the cache memory 30*a* having the primary data area 31*a* in which the data $P_1$ is stored is referred to as a cache memory on a primary side. Meanwhile, the cache memory 30*b* having the backup data area 32*b* in which the data $B_1$ as a backup data of the data $P_1$ is referred to as a cache memory on a backup side. Similarly, in FIG. 2, if focusing on a data $P_2$ (=a data $B_2$), a cache memory on the primary side is the cache memory 30*b*, and a cache memory on the backup side is the cache memory 30*a*.

In the example shown in FIG. 2, it is assumed that the cache memories 30*a*, 30*b* have been previously associated with the data disks 20*a*, 20*b* as described below.

The primary data area 31*a* in the cache memory 30*a* has been associated with the primary data area 21*a* in the data disk 20*a*.

The backup data area 32*a* in the cache memory 30*a* has been associated with the backup data area 22*a* in the data disk 20*a*.

The primary data area 31*b* in the cache memory 30*b* has been associated with the primary data area 21*b* in the data disk 20*b*.

The backup data area 32*b* in the cache memory 30*b* has been associated with the backup data area 22*b* in the data disk 20*b*.

The cache memory capacity detection unit 141 and the data placement control unit 15 shown in FIG. 1 provide control of transferring a data from the cache memory 30 to the data disk 20.

The cache memory capacity detection unit 141 detects a current queue length in the cache memory 30.

The data placement control unit 15 provides control of transferring a data stored in the cache memory 30 to an appropriate data disk 20 according to the detected current queue length in the cache memory 30.

In this embodiment, the cache memory capacity detection unit 141 is configured to compare a detected queue length with a prescribed threshold for classifying a memory capacity into some statuses, to thereby detect a status of a current memory capacity. The data placement control unit 15 then transfers the data stored in the cache memory 30 to the appropriate data disk 20, if it is detected that a queue length in the cache memory 30 is in a status of a memory capacity within a threshold within which a data is to be transferred to a disk.

Note that, if the cache memory 30 is, for example, a disk or a SSD, the memory capacity means a capacity of the disk or the SSD.

In this embodiment, a memory capacity is classified into, as an example, three statuses using a magnitude relation among a current queue length W, and two thresholds, namely, a minimum allowable queue size $W_{th}$ and a maximum allowable queue size $W_{max}$, according to the following conditions (a1) to (a3):

$$W<W_{th} \quad (a1)$$

$$W_{th}<W<W_{max} \quad (a2)$$

$$W>W_{max} \quad (a3)$$

If the current queue length W satisfies the condition (a1), this means that the cache memory 30 has a memory capacity in a status in which a sufficient amount of data to be written to the data disk 20 has not yet been accumulated. Thus, the data placement control unit 15 does not yet write any data. This can contribute to power saving.

If the current queue length W satisfies the condition (a2), this means that the cache memory 30 has a memory capacity in a status in which a certain amount of data to be written to the data disk 20 has already been accumulated. Thus, the data placement control unit 15 writes the data to the data disk 20 to which the data is to be written, if the data disk 20 is in the normal rotation state. In other words, even if the current queue length W satisfies the condition (a2), the data placement control unit 15 does not write the data to the data disk 20 of interest if the data disk 20 is in the rotation stop state. This can contribute to power saving.

If the current queue length W satisfies the condition (a3), this means that the cache memory 30 has a memory capacity in a status in which an excessive amount of data to be written has been accumulated in the data disk 20. Thus, the data placement control unit 15 writes the data to the data disk 20 of interest. At this time, if the data disk 20 of interest is in the rotation stop state, the data placement control unit 15 spins up the data disk 20 and writes the data thereto.

When the data placement control unit 15 writes data from the cache memories 30 to the data disks 20, the data placement control unit 15 writes a primary data in synchronization with a backup data if the primary data and the backup data are to be stored in the same data disk 20. That is, in the example shown in FIG. 2, the data placement control unit 15 writes, for example, the data $P_1$ from the cache memory 30a to the data disk 20a, which is followed by writing the data $B_2$. The data placement control unit 15 writes, for example, the data $B_2$ from the cache memory 30a to the data disk 20a, which is followed by writing the data $P_1$. The data placement control unit 15 performs a similar write processing between the cache memory 30b and the data disk 20b.

In the storage device 1, with respect to a data of a write request, a rotation state of the data disk 20 on the primary side is typically asynchronous with that on the backup side. Therefore, depending on timing, contents of the data $P_1$ stored in the data disk 20a may not be identical to contents of the data $B_1$ stored in the data disk 20b in some cases. Similarly, contents of the data $P_2$ may not be identical to contents of the data $B_2$ in some cases. However, in this embodiment, the data placement control unit 15 manages whether or not a data stored in each of the storage units is the newest, and both the cache memory 30 on the primary side and the cache memory 30 on the backup side are provided. This allows contents of a data stored in the data disk 20 on the primary side to be identical to those on the backup side even if there may be a difference between the two contents for a certain time period.

As described above, the data placement control unit 15 performs a processing of transferring a data stored in the cache memory 30 of interest to the appropriate data disk 20 in terms of both the primary processing and the backup processing described above, according to a queue length of the cache memory 30 or a rotation state of the data disk 20. Details of those operations are to be described later.

[3. Outline of Configuration for Stable Data Read]

The storage device 1 shown in FIG. 1 includes the cache disk 40 which is a read only disk so as to stably perform a read processing. Next is described a relation between the system management unit 10, the data disk 20, the cache memory 30, and the cache disk 40.

The cache disk 40 stores therein a data which is a copy of an original data stored in the data disk 20 and always keeps a normal rotation state. The cache disk 40 is configured by, for example, a generally available magnetic disk device, an optical disk device, a magneto optical disk drive, a SSD (Solid State Drive), or the like. The cache disk 40 may be configured by the same one as that of the data disk 20. In this case, it is not necessary to partition a storage area of the cache disk 40 into a primary data area and a backup data area.

In the example shown in FIG. 1, the cache disk 40 stores therein the primary data 41 and the backup data 42 without specifically partitioning a storage area thereof. In this case, the primary data 41 refers to, for example, a data which is a copy of an original data (for example, the data $P_1$) stored in the data disk 20 on the primary side. The backup data 42 refers to, for example, a data which is a copy of a data (for example, the data $B_2$) stored in the backup data area 22a in the data disk 20a.

In FIG. 1, only one unit of the cache disk 40 is exemplified, however, the storage device 1 may include a plurality of the cache disks 40. For example, if all of the cache disks 40 and the data disks 20 are of similar size, the number of the cache disks 40 is preferably smaller than that of the data disks 20. From standpoint of electric power saving, it is particularly preferable if the number of the cache disks 40 is about 30% of that of the data disks 20 (see FIG. 8).

The data placement control unit 15 shown in FIG. 1 provides control of storing a data in the cache disk 40. The data placement control unit 15 manages each of the data disks 20 and each of the cache memories 30 and also manages information on association of each of the cache disks 40 and a data to be stored in the each cache disk, or the like, using a database not shown.

Figure 10A:
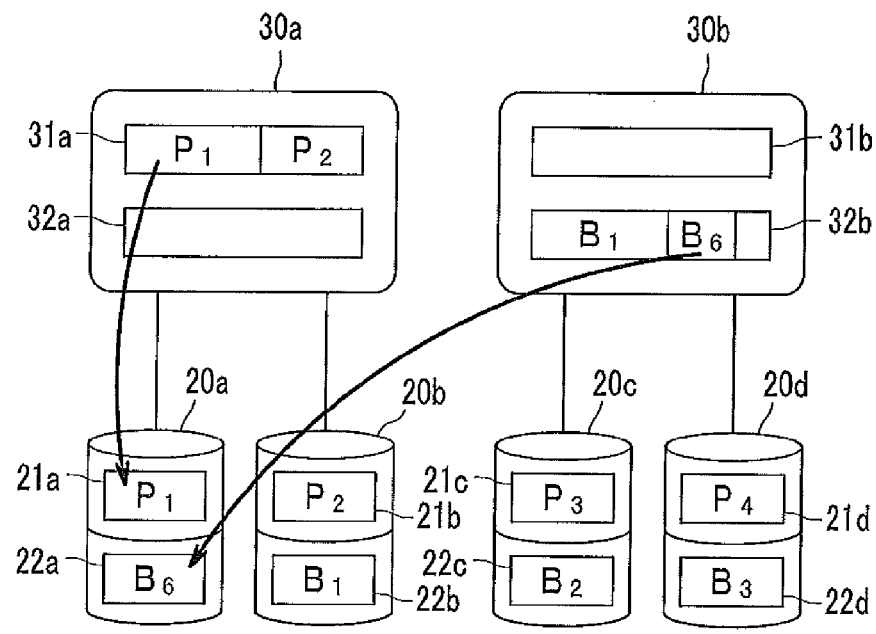
FIGS. 10A and 10B are explanatory diagrams schematically illustrating a processing of writing a data received from a network to a cache disk in the storage according to the embodiment.
Figure 10B:
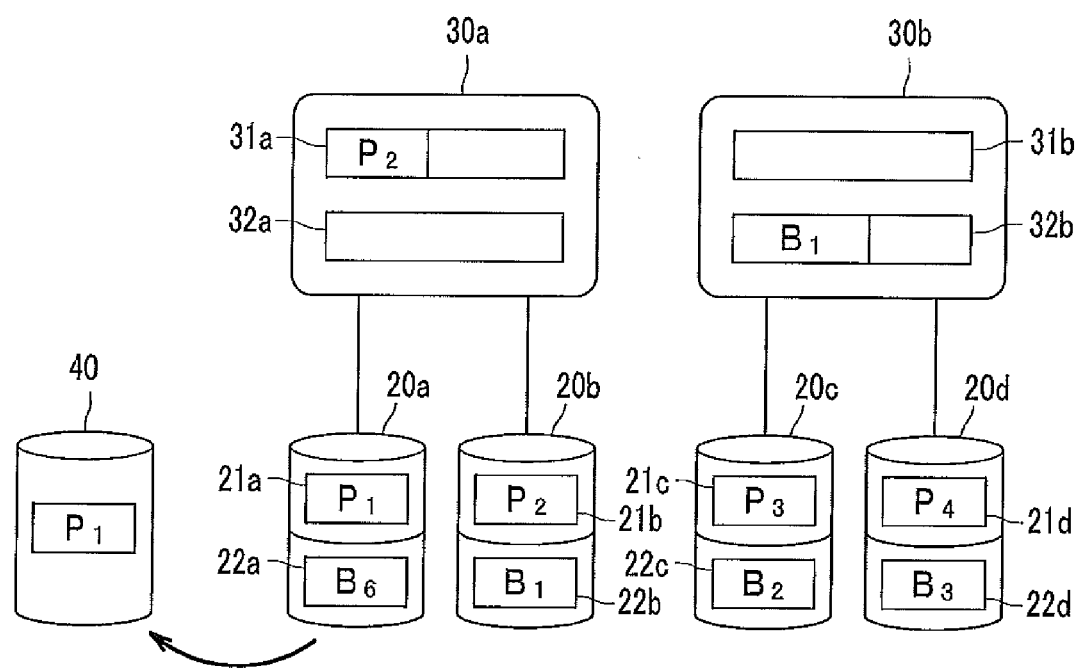

The data placement control unit 15 stores a copy of a data stored in the primary data area 21a in the data disk 20a, in the cache disk 40 as shown in, for example, FIG. 10B, which is part of FIG. 8. At this time, the data disk 20a is in the normal rotation state. Thus, in this embodiment, the data placement control unit 15 performs the processing of transferring a data stored in the cache memory 30 to the data disk 20, and then, copies the data stored in the data disk 20 and stores the data in the cache disk 40. This allows the data disk 20 to be kept in the rotation stop state unless it is necessary, which can save electric power. Note that the data placement control unit 15 performs the processing of copying a data and storing the copied data in the cache disk 40 in terms of both the primary processing and the backup processing described above. Details of those operations are to be described later.

In the storage device 1, the cache disk 40 always keeps the normal rotation state. Meanwhile, the data disk 20 is made to keep the rotation stop state unless it is necessary. When a read request is made, the data placement control unit 15 thus reads out an appropriate data for which the read request has been made, preferentially from the cache disk 40 rather than the data disk 20.

Further, if the storage device 1 is configured to include the cache memory 30 as in this embodiment, the data placement control unit 15 reads out an appropriate data as a target of the read request, preferentially from the cache memory 30 rather than the cache disk 40 as described above. In this case, the data placement control unit 15 first searches the cache memory 30 on the primary side, for a data to be read, and then searches the cache memory 30 on the backup side for the data to be read.

Upon a read request, the data placement control unit 15 writes an appropriate data from the data disk 20 in which an original data is stored, to the cache disk 40, only when the data is not stored in the cache disk 40 or a cache mishit occurs. The data placement control unit 15 then returns the data having been written to the cache disk 40 as a response. When the data is written from the data disk 20 to the cache disk 40 as just described, the data placement control unit 15 reads out the data from either the data disk 20 on the primary side or the data disk 20 on the backup side according to prescribed rules (b1) to (b3) as shown below. The rules are made in order that an unnecessary rotation start of the data disk 20 can be avoided as much as possible in writing a data to the cache disk 40 and that electric power can be saved.

(b1) If either one of a data disk on the primary side $D_{primary}$ which corresponds to a cache memory on the primary side and a data disk on the backup side $D_{backup}$ which corresponds to a cache memory on the backup side is in the rotation stop state, the data placement control unit 15 reads out an appropriate data from either of the data disks which is in the normal rotation state.

(b2) If both the data disk on the primary side $D_{primary}$ and the data disk on the backup side $D_{backup}$ are in the rotation stop state, the data placement control unit 15 selects either of the data disk 20 which corresponds to the cache memory 30 with a side having a larger total queue size made up of all data cashed (memory cache data).

In this case, the data placement control unit 15 makes the disk rotation state control unit 143 spin up the selected data disk 20 and rotate the data disk 20 up to the normal rotation state, then accesses the data disk 20, and reads out an appropriate data therefrom. Herein, because the data placement control unit 15 selects the side having a larger total queue size as described above, it becomes easier to update data stored in the data disk 20 before a memory capacity of the cache memory 30 exceeds an allowable limit. This has an effect of reducing a time period during which there is a difference between a primary data and a backup data.

(b3) If both the data disk on the primary side $D_{primary}$ and the data disk on the backup side $D_{backup}$ are in the rotation stop state and also have the same total queue sizes of their respective memory cache data, the data placement control unit 15 selects the data disk 20 having a side whose time period in the rotation stop state is longer. Also in this case, the data placement control unit 15 makes the disk rotation state control unit 143 spin up the selected data disk 20 and rotate the data disk 20 up to the normal rotation state, then accesses the data disk 20, and reads out an appropriate data therefrom. Note that, if the storage device 1 is not configured to include the cache memory 30, the selection is made using only the time period in the rotation stop state.

[4. Operations of Storage Device if Cache Unit is One]

Herein is described an example of operations of the storage device 1 if a cache unit is one, as shown in FIG. 2. Note that, in FIG. 2, the numbers of the data disks 20 and the cache memories 30 of the storage device 1 are both "2", however, a generalized description is made herein assuming that the numbers are plural. The description is also made in the following sections in this order: 4-1. Outline of write processing; 4-2. Primary data processing; 4-3. Backup data processing; and 4-4. Read processing.

[4-1. Outline of Write Processing]

Figure 3:
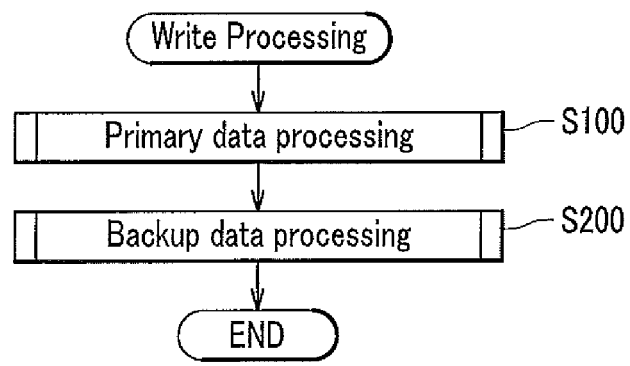
FIG. 3 is a flowchart illustrating an entire flow of a write processing in the storage device of FIG. 2 according to the embodiment.

FIG. 3 is a flowchart illustrating an entire flow of a write processing in the storage device of FIG. 2. The write processing is a processing of writing a data to a storage unit performed by the system management unit 10. The write processing includes a primary data processing (step S100) and a backup data processing (step S200).

[4-2. Primary Data Processing]

Figure 4A:
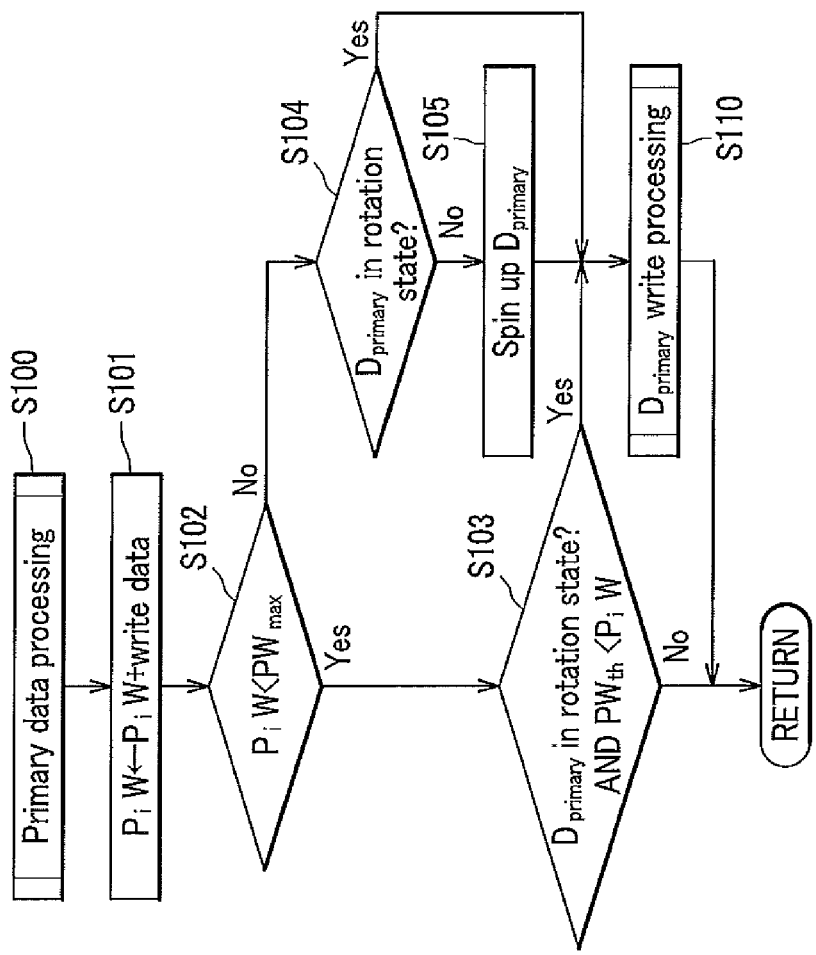
FIGS. 4A and 4B are flowcharts each illustrating a primary data processing of FIG. 3 according to the embodiment.
Figure 4B:
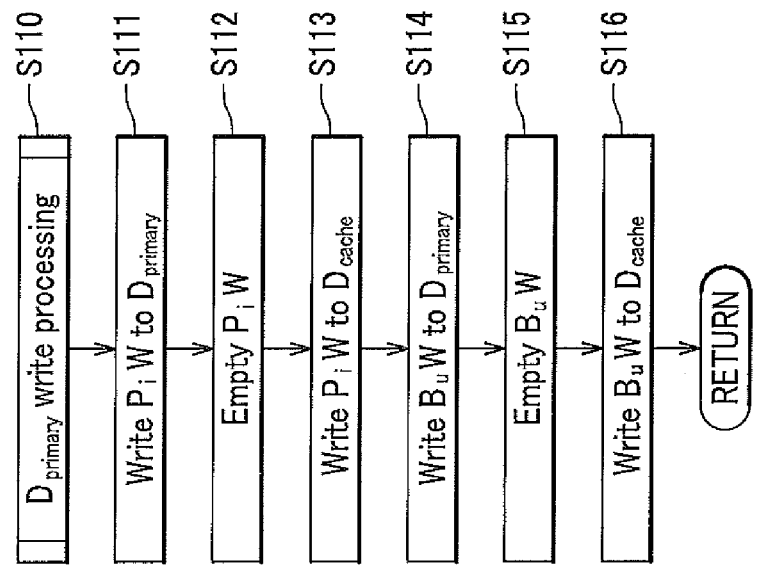

The primary data processing of step S100 is described with reference to FIGS. 4A and 4B (see FIG. 1 and FIG. 2 where necessary). FIGS. 4A and 4B are flowcharts each illustrating the primary data processing of FIG. 3. FIG. 4A illustrates an entire flow of the processing, and FIG. 4B illustrates a $D_{Primary}$ write processing.

The $D_{Primary}$ used herein means a disk in which, if a data of interest is given, a data on a primary side corresponding to the data of interest is stored. For example, if data is arranged as shown in FIG. 2 and the data $P_1$ is focused on, the data disk 20a is the $D_{Primary}$. Likewise, if data is arranged as shown in FIG. 2 and the data $P_2$ is focused on, the data disk 20b is the $D_{Primary}$.

In the primary data processing (step S100), as shown in FIG. 4A, the cache memory capacity detection unit 141 of the system management unit 10 determines a current primary layer data queue $P_iW$ in an i-th cache memory with a write data received from outside added thereto, as a new primary layer data queue $P_iW$ (step S101). Herein, a default value of the current primary layer data queue $P_iW$ is, for example, 0. Also, as shown in FIG. 2, if i=1, the cache memory 30a is referred to, and if i=2, the cache memory 30b is referred to.

The cache memory capacity detection unit 141 then determines whether or not a queue length of the newly-determined primary layer data queue $P_iW$ is smaller than the maximum allowable queue size $PW_{max}$ in the primary layer data queue (step S102). If the queue length of the primary layer data queue $P_iW$ is smaller than the maximum allowable queue size $PW_{max}$ in the primary layer data queue (step S102: Yes), the data placement control unit 15 determines whether or not conditions as follows are satisfied: a data disk $D_{primary}$ corresponding to a primary layer data in the i-th cache memory is in a rotation state; and the queue length of the primary layer data queue $P_iW$ is larger than a queue size threshold $PW_{th}$ in the primary layer data queue (step S103).

In step S103, if the conditions are satisfied that the data disk $D_{primary}$ is in the rotation state and the queue length of the primary layer data queue $P_iW$ is larger than the threshold $PW_{th}$ (step S103: Yes), the system management unit 10 advances the processing to a $D_{primary}$ write processing in step S110. The $D_{primary}$ write processing in step S110 is to be described in detail hereinafter. After completion of the $D_{primary}$ write processing, the system management unit 10 returns the processing to step S101. On the other hand, if the conditions are not satisfied that the data disk $D_{primary}$ is in the rotation state and the queue length of the primary layer data queue $P_iW$ is larger than the threshold $PW_{th}$ (step S103: No), the system management unit 10 returns the processing to step S101.

In step S102, if the queue length of the primary layer data queue $P_iW$ is equal to or more than a maximum allowable queue size $PW_{max}$ in the primary layer data queue (step S102: No), the disk rotation state detection unit 142 determines whether or not the data disk $D_{primary}$ corresponding to the primary layer data in the i-th cache memory is in the rotation state (step S104).

In step S104, if the data disk $D_{primary}$ is not in the rotation state (step S104: No), the disk rotation state control unit 143 spins up the data disk $D_{primary}$ (step S105). Following step S105, the system management unit 10 advances the processing to step S110. On the other hand, in step S104, if the data disk $D_{primary}$ is in the rotation state (step S104: Yes), the system management unit 10 skips step S105 and advances the processing to step S110.

<$D_{primary}$ Write Processing of Step S110>

Next is described the $D_{primary}$ write processing of step S110. As shown in FIG. 4B, the data placement control unit 15 writes the primary layer data queue $P_iW$ in the i-th cache memory to a corresponding data disk $D_{primary}$ (primary layer) (step S111). In FIG. 2, if, for example, i=1, the data placement control unit 15 writes the data $P_1$ in the primary data area 31*a* in the cache memory 30*a*, to the primary data area 21*a* (primary layer) in the data disk 20*a*.

The data placement control unit 15 then empties the primary layer data queue $P_iW$ in the i-th cache memory (step S112). The data placement control unit 15 writes the $P_iW$ written from the i-th cache memory to the corresponding data disk $D_{primary}$ (primary layer), to a cache disk $D_{cache}$ (step S113). The cache disk $D_{cache}$ corresponds to the cache disk 40 shown in FIG. 1. Note that FIG. 1 exemplifies one unit of the cache disk 40, however, the number of the cache disks 40 is not limited and may be plural. In the latter case, the cache disk $D_{cache}$ is one of the plural cache disks 40.

The data placement control unit 15 writes a memory cache data $B_uW$ (backup layer data queue of a cache memory) corresponding to a backup layer data of the data disk $D_{primary}$, to the data disk $D_{primary}$ (backup layer). In FIG. 2, if i=1, the data placement control unit 15 writes the data $B_2$ in the backup data area 32*a*, to the backup data area 22*a* (backup layer) in the data disk 20*a*.

The "u (unknown)" used herein means, in a case where a plurality of pairs of the cache memory and the data disk are present, an identification number which is created by generalizing a data in a backup layer corresponding to the primary layer of the data disk $D_{primary}$. Therefore, if, for example, three pairs of the cache memory and the data disk are present and if i=1, then u=2 or u=3 is possible. In the example of FIG. 2, if i=1, then u=1, and if i=2, then u=2.

Note that the data placement control unit 15 empties the backup layer data queue $B_uW$ in the cache memory written in the data disk $D_{primary}$ (backup layer) (step S115). The data placement control unit 15 writes the $B_uW$ written in the data disk $D_{primary}$ (backup layer), to the cache disk $D_{cache}$ (step S116).

[4-3. Backup Data Processing]

Figure 5B:
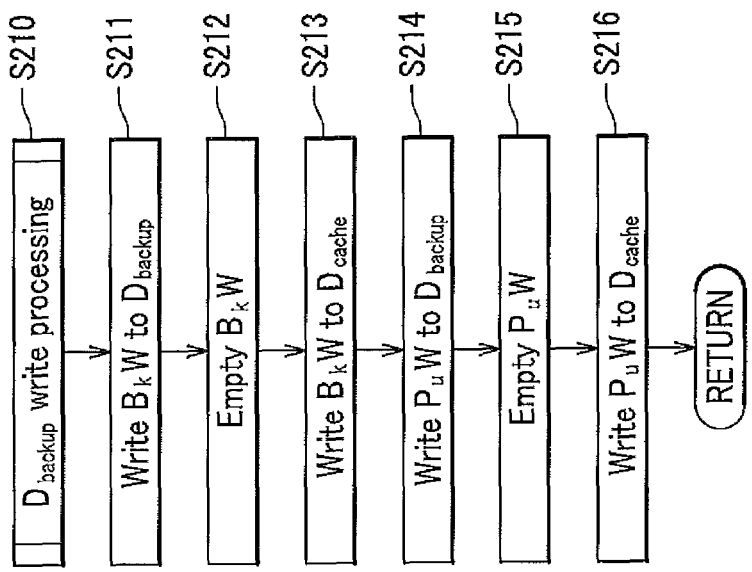
FIGS. 5A and 5B are flowcharts each illustrating a backup data processing of FIG. 3 according to the embodiment.
Figure 5A:
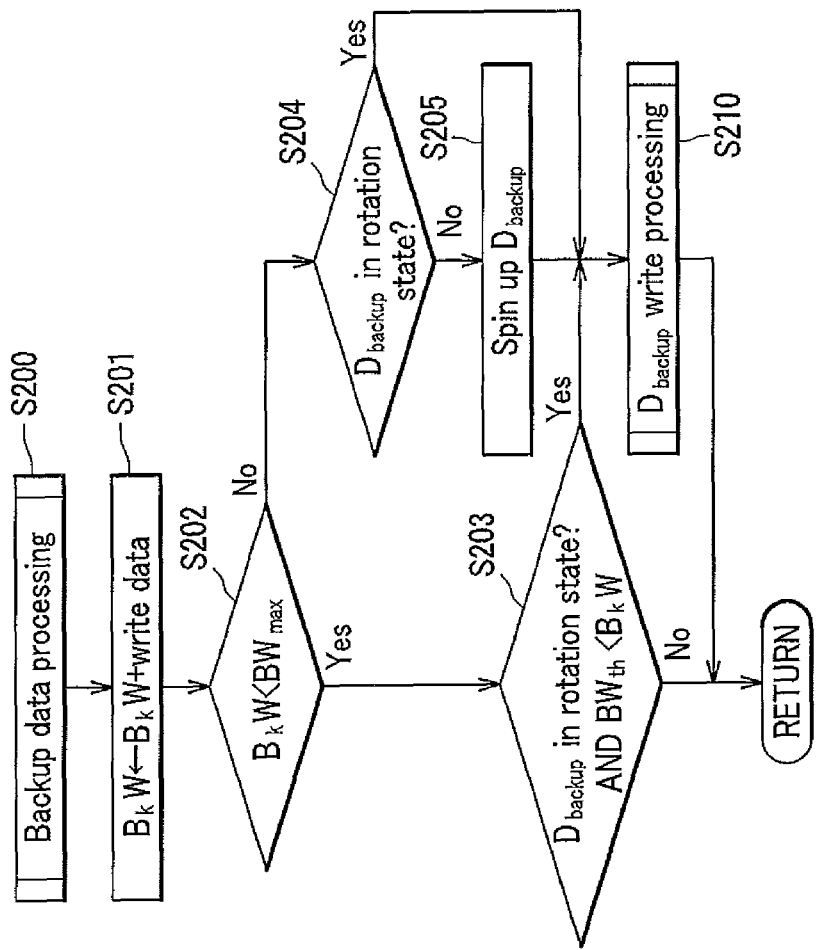

Next is described the backup data processing of step S200 with reference to FIG. 5 (see FIG. 1 and FIG. 2 where necessary). FIG. 5A and FIG. 5B are flowcharts each illustrating the backup data processing of FIG. 3. FIG. 5A illustrates an entire flow of the processing and FIG. 5B illustrates a $D_{Backup}$ write processing.

The $D_{Backup}$ used herein means a disk in which, if a data of interest is given, a data on the backup side corresponding to the data of interest is stored. For example, if data is arranged as shown in FIG. 2 and the data $B_1$ is focused on, the data disk 20*b* is the $D_{Backup}$. Likewise, if data is arranged as shown in FIG. 2 and the data $B_2$ is focused on, the data disk 20*a* is the $D_{Backup}$.

In the backup data processing (step S200), as shown in FIG. 5A, the cache memory capacity detection unit 141 of the system management unit 10 determines a new backup layer data queue $B_kW$ which is created by adding a write data received from outside to a backup layer data queue $B_kW$ stored in a k-th cache memory, as a backup layer for a primary layer data in the i-th cache memory to which the primary data processing is performed (step S201). Herein, a default value of the current backup layer data queue $B_kW$ is, for example, 0. Also, as shown in FIG. 2, if i=1 and k=2, the cache memory 30*b* is referred to, and if i=2 and k=1, the cache memory 30*a* is referred to.

The cache memory capacity detection unit 141 then determines whether or not a queue length of the backup layer data queue $B_kW$ is smaller than a maximum allowable queue size $BW_{max}$ in the backup layer data queue (step S202). If the queue length of the backup layer data queue $B_kW$ is smaller than the maximum allowable queue size $BW_{max}$ in the backup layer data queue (step S202: Yes), the data placement control unit 15 determines whether or not conditions as follows are satisfied: a data disk $D_{backup}$ corresponding to the backup layer data $B_kW$ of the primary layer data $P_iW$ in the i-th cache memory is in a rotation state; and the queue length of the backup layer data queue $B_kW$ is larger than a queue size threshold $BW_{th}$ in the backup layer data queue (step S203).

In step S203, if the conditions are satisfied that the data disk $D_{backup}$ is in the rotation state and the queue length of the backup layer data queue $B_kW$ is larger than the threshold $BW_{th}$ (step S203: Yes), the system management unit 10 advances the processing to a $D_{backup}$ write processing of step S210. The $D_{backup}$ write processing is to be described in detail hereinafter. After completion of the $D_{backup}$ write processing, the system management unit 10 returns the processing to step S201. On the other hand, if the conditions are not satisfied that the data disk $D_{backup}$ is in the rotation state and the queue length of the backup layer data queue $B_kW$ is larger than the threshold $BW_{th}$ (step S203: No), the system management unit 10 returns the processing to step S201.

In step S202, if the queue length of the backup layer data queue $B_kW$ is equal to or more than the maximum allowable queue size $BW_{max}$ in the backup layer data queue (step S202: No), the disk rotation state detection unit 142 determines whether or not the data disk $D_{backup}$ corresponding to the backup layer data $B_kW$ is in the rotation state (step S204).

In step S204, if the data disk $D_{backup}$ is not in the rotation state (step S204: No), the disk rotation state control unit 143 spins up the data disk $D_{backup}$ (step S205). Following step S205, the system management unit 10 advances the processing to step S210. On the other hand, in step S204, if the data disk $D_{backup}$ is in the rotation state (step S204: Yes), the system management unit 10 skips step S205 and advances the processing to step S210.

<$D_{backup}$ Write Processing of Step S210>

Next is described the $D_{backup}$ write processing of step S210. As shown in FIG. 5B, the data placement control unit 15 writes the backup layer data queue $B_kW$ stored in the k-th cache memory to a corresponding data disk $D_{backup}$ (backup layer) (step S211). In FIG. 2, if, for example, i=1 and k=2, the data placement control unit 15 writes the data $B_1$ in the backup data area 32*b* in the cache memory 30*b*, to the backup data area 22*b* (backup layer) in the data disk 20*b*.

The data placement control unit 15 then empties the backup layer data queue $B_kW$ in the k-th cache memory (step S212). The data placement control unit 15 then writes the $P_iW$ written from the k-th cache memory to the corresponding data disk $D_{backup}$ (backup layer), to a cache disk $D_{cache}$ (step S213).

The data placement control unit 15 writes a memory cache data $P_uW$ (primary layer data queue of a cache memory)

corresponding to a primary layer data of the data disk $D_{backup}$, to the data disk $D_{backup}$ (primary layer) (step S214). In FIG. 2, if i=1 and k=2, the data placement control unit 15 writes the data $P_2$ in the primary data area 31b in the cache memory 30b, to the primary data area 21b (primary layer) in the data disk 20b.

The "u (unknown)" used herein means an identification number which is created by generalizing a data in a primary layer corresponding to a backup layer of the data disk $D_{backup}$, if a plurality of pairs of the cache memory and the data disk are present. In the example shown in FIG. 2, if i=1 and k=2, then u=2. If i=2 and k=1, then u=1.

The data placement control unit 15 empties the primary layer data queue $P_u W$ in the cache memory written in the data disk $D_{backup}$ (primary layer) (step S215). The data placement control unit 15 then writes the $P_u W$ written in the data disk $D_{backup}$ (primary layer), to the cache disk $D_{cache}$ (step S216).

[4-4. Read Processing]

Figure 6:
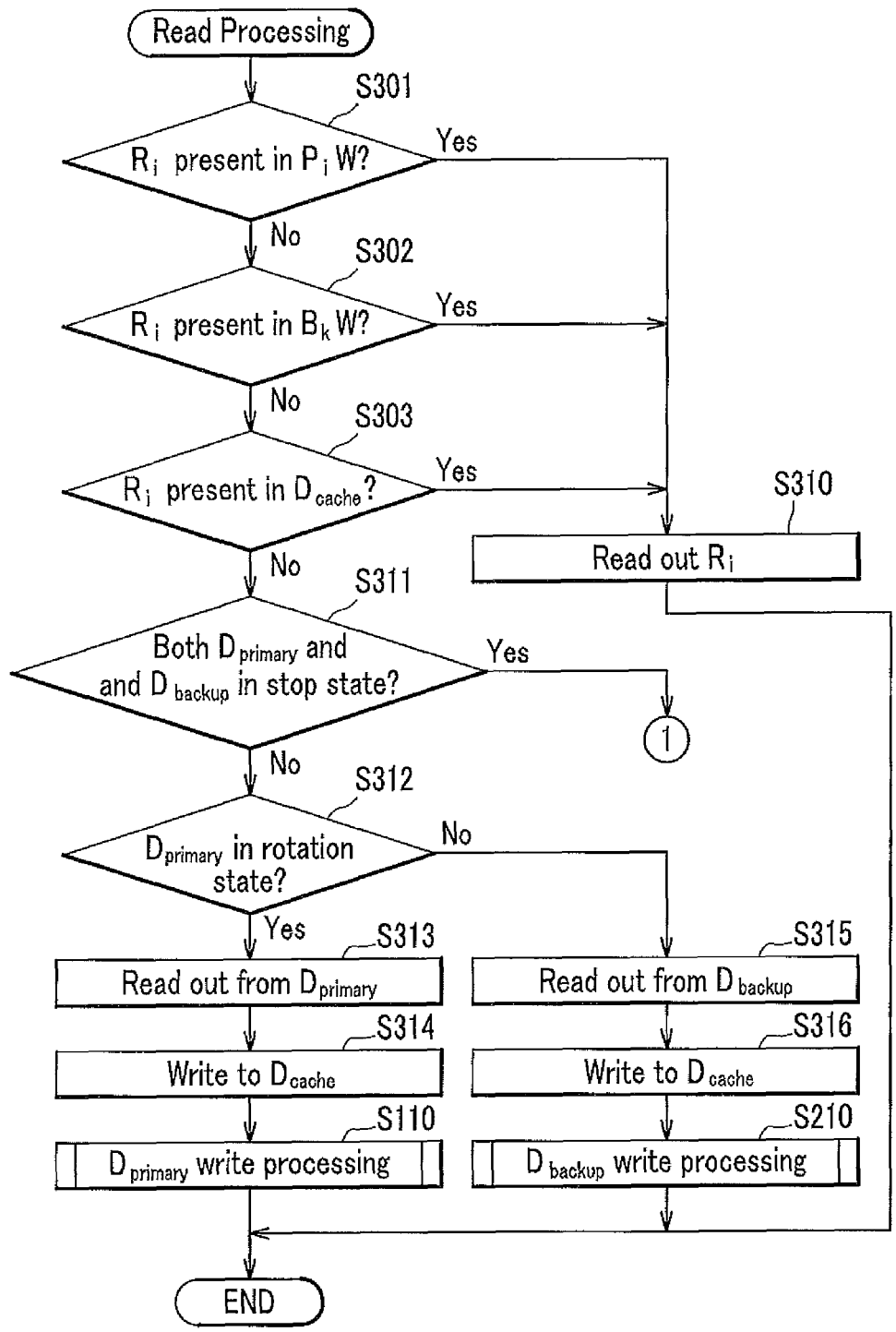
FIG. 6 is a flowchart illustrating a flow of a read processing in the storage device of FIG. 2 according to the embodiment and is to be continued to FIG. 7.
Figure 7:
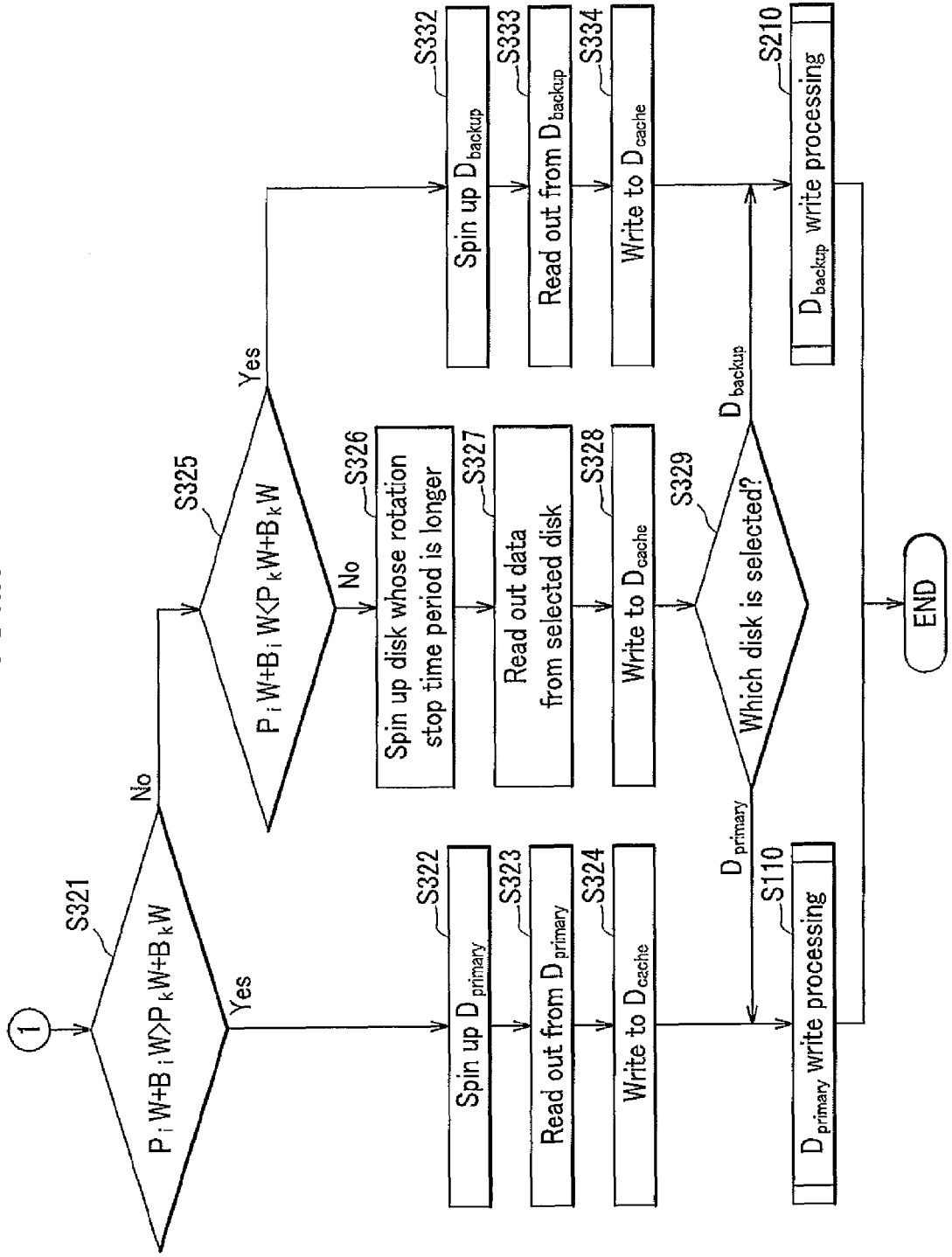
FIG. 7 is a flowchart illustrating a flow of a read processing in the storage device of FIG. 2 and FIG. 8 according to the embodiment and is continued from FIG. 6.

Next is described a processing in which the system management unit 10 reads out a data from a storage unit (a read processing) with reference to FIG. 6 and FIG. 7 (see FIG. 1 and FIG. 2 where necessary).

As shown in FIG. 6, the data placement control unit 15 of the system management unit 10 determines whether or not a data $R_i$ as a read target is present in the primary layer data $P_i W$ in the i-th cache memory (step S301). In FIG. 2, if, for example, i=1, the data placement control unit 15 determines whether or not the data $R_i$ is present in the primary data area 31a in the cache memory 30a.

If the data $R_i$ as the read target is not present in the primary layer data $P_i W$ (step S301: No), the data placement control unit 15 determines whether or not the data $R_i$ as the read target is present in the backup layer data $B_k W$ stored in the k-th cache memory as a backup layer for the primary layer data in the i-th cache memory (step S302). In FIG. 2, if, for example, i=1, then k=2. Thus, the data placement control unit 15 determines whether or not the data $R_i$ is present in the backup data area 32b in the cache memory 30b.

If the data $R_i$ as the read target is not present in the backup layer data $B_k W$ (step S302: No), the data placement control unit 15 determines whether or not the data $R_i$ as the read target is present in the cache disk $D_{cache}$ (step S303). If the data $R_i$ as the read target is not present in the cache disk $D_{cache}$ (step S303: No), the data placement control unit 15 advances the processing to a determination processing in step S311.

On the other hand, if the data $R_i$ as the read target is present in the primary layer data $P_i W$ (step S301: Yes), or if the data $R_i$ as the read target is present in the backup layer data $B_k W$ (step S302: Yes), or if the data $R_i$ as the read target is present in the cache disk $D_{cache}$ (step S303: Yes), then the data placement control unit 15 reads out the data $R_i$ as the read target (step S310) and terminates the processing.

<Determination Processing in Step S311>

Herein is described the determination processing in step S311. As shown in FIG. 6, in step S311, the data placement control unit 15 determines whether or not both the data disk $D_{primary}$ corresponding to a memory cache data in the primary layer and the data disk $D_{backup}$ corresponding to a memory cache data in the backup layer are in a stop state. In a case where data is arranged as shown in FIG. 2 and the data $P_1$ and the data $B_1$ are focused on, and if, for example, i=1 and k=2, then the data disk $D_{primary}$ refers to the data disk 20a, and the data disk $D_{backup}$ refers to the data disk 20b.

In step S311, if both of the data disk $D_{Primary}$ and the data disk $D_{backup}$ are not in the stop state (step S311: No), the data placement control unit 15 determines whether or not the data disk on the primary side $D_{Primary}$ is in the rotation state (step S312).

In step S312, if the data disk on the primary side $D_{primary}$ is in the rotation state (step S312: Yes), the data placement control unit 15 reads out the data $R_i$ as the read target from the data disk $D_{primary}$ (step S313). The data placement control unit 15 then writes the data $R_i$ read out from the data disk $D_{primary}$ to the cache disk $D_{cache}$ (step S314). This makes it possible to output a response data to a read request, by reading the data $R_i$ from the cache disk $D_{cache}$ by the data read unit 131 of the data distribution unit 13.

Then, because the data disk $D_{primary}$ is in the rotation state, the data placement control unit 15 performs a processing similar to the $D_{primary}$ write processing of step S110 as described above. That is, the data placement control unit 15 performs steps S111 to S116 described above. The system management unit 10 thus completes the read processing if the data disk on the primary side $D_{primary}$ is in the rotation state. Note that, following the completion, the disk rotation state control unit 143 may stop the rotation of the data disk $D_{primary}$.

In step S312, if the data disk on the primary side $D_{primary}$ is not in the rotation state (step S312: No), because the data disk on the backup side $D_{backup}$ is in the rotation state, the data placement control unit 15 reads out the data $R_i$ as the read target from the data disk $D_{backup}$ in the rotation state (step S315). The data placement control unit 15 writes the data $R_i$ read out from the data disk $D_{backup}$, to the cache disk $D_{cache}$ (step S316). This makes it possible to output a response data to a read request, by reading the data $R_i$ from the cache disk $D_{cache}$ by the data read unit 131.

Then, because the data disk $D_{backup}$ is in the rotation state, the data placement control unit 15 performs a processing similar to the $D_{backup}$ write processing of step S210 as described above. That is, the data placement control unit 15 performs steps S211 to S216 described above. The system management unit 10 thus completes the read processing in a case where the data disk on the backup side $D_{backup}$ is in the rotation state. Note that, following the completion, the disk rotation state control unit 143 may stop the rotation of the data disk $D_{backup}$.

On the other hand, in step S311, if both the data disk $D_{primary}$ and the data disk $D_{backup}$ are in the stop state (step S311: Yes), the system management unit 10 advances the processing to a determination processing in step S321.

<Determination Processing in Step S321>

Herein is described the determination processing in step S321. As shown in FIG. 7, in step S321, the data placement control unit 15 determines whether or not a total queue size ($P_i W + B_i W$) of the i-th memory cache data indicating a data disk $D_{primary}$ (primary layer) side is larger than a total queue size ($P_k W + B_k W$) of the k-th memory cache data indicating a data disk $D_{backup}$ (backup layer) side (step S321).

In a case where data is arranged as shown in FIG. 2 and the data $P_1$ and the data $B_1$ are focused on, if, for example, i=1 and k=2, then the cache memory on the data disk $D_{primary}$ refers to the cache memory 30a, and the cache memory on the data disk $D_{backup}$ refers to the cache memory 30b. In this case, the total queue size ($P_i W + B_i W$) therefore represents a sum of a memory capacity of the primary data area 31a and a memory capacity of the backup data area 32a.

Also, in this case, the total queue size ($P_k W + B_k W$) represents a sum of a memory capacity of the primary data area 31b and a sum of a memory capacity of the backup data area 32b.

In step S321, if the total queue size ($P_i W + B_i W$) of the memory cache data on the primary layer side is larger than the total queue size ($P_kW+B_kW$) of the memory cache data on the backup layer side (step S321: Yes), the disk rotation state control unit 143 spins up the data disk $D_{primary}$ on the primary layer side (step S322). In FIG. 2, if, for example, i=1 and k=2, then the disk rotation state control unit 143 spins up the data disk 20a. The data placement control unit 15 then performs steps S323, S324, and S110. Those steps are the same or similar to steps S313, S314, and S110 described above, respectively, and description thereof is omitted herefrom.

Meanwhile, in step S321, if the total queue size ($P_iW+B_iW$) of the memory cache data on the primary layer side is equal to or smaller than the total queue size ($P_kW+B_kW$) of the memory cache data on the backup layer side (step S321: No), the data placement control unit 15 determines whether or not the total queue size ($P_kW+B_kW$) of the memory cache data on the backup layer side is larger than the total queue size ($P_iW+B_iW$) of the memory cache data on the primary layer side (step S325).

In step S325, if the total queue size ($P_kW+B_kW$) of the memory cache data on the backup layer side is larger than the total queue size ($P_iW+B_iW$) of the memory cache data on the primary layer side (step S325: Yes), the disk rotation state control unit 143 spins up the data disk $D_{backup}$ on the backup layer side (step S332). In FIG. 2, if, for example, i=1 and k=2, then the disk rotation state control unit 143 spins up the data disk 20b. The data placement control unit 15 then performs steps S333, S334, and S210. Those steps are the same or similar to steps S315, S316, and S210 described above, respectively, and description thereof is omitted herefrom.

In step S325, if the total queue size ($P_kW+B_kW$) of the memory cache data on the backup layer side is equal to the total queue size ($P_iW+B_iW$) of the memory cache data on the primary layer side (step S325: No), the data placement control unit 15 selects, between the $D_{primary}$ and the $D_{backup}$ both in the stop state, either of the data disks whose rotation stop time period is longer than the other. The disk rotation state control unit 143 spins up the selected data disk (step S326).

The data placement control unit 15 then performs steps S327 and S328. Those steps are similar to steps S313 and S314 described above or steps S315 and S316 described above, respectively, and description thereof is thus omitted herefrom. If a result obtained from the determination in step S325 described above shows that the selected data disk is a data disk on the primary side (step S329: $D_{primary}$) the data placement control unit 15 performs the processing of step S110 described above. On the other hand, if the result shows that the selected data disk is a data disk on the backup side (step S329: $D_{backup}$) the data placement control unit 15 performs step S210 described above.

[5. Operations of Storage Device if Cache Unit is More than One]

Herein are described operations of the storage device 1 if the cache unit is more than one, as exemplified in FIG. 8. Description below is made in the following sections in this order: 5-1. Configuration example of storage device; 5-2. Primary data processing of write processing; 5-3. Backup data processing of write processing; and 5-4. Read processing.

[5-1. Configuration Example of Storage Device]

FIG. 8 illustrates an example of a combination of respective storage units as a main part of a storage device if the cache unit is more than one. The terms used herein that the cache unit is more than one mean that each of the cache memories 30 stores data of the data disk 20 having plural nodes on both the primary layer side and the backup layer side.

The storage device 1 shown in FIG. 8 includes a data disk 20a, a data disk 20b, a data disk 20c, a data disk 20d, a data disk 20e, and a data disk 20f. The data disks 20a to 20f have a configuration similar to that of the data disks 20a, 20b shown in FIG. 2, except that the former data disks and types of data are both six in number. The same reference numbers are thus given to the former components as the latter ones, and description thereof is omitted herefrom.

Note that primary data $P_1$ to $P_6$ are made to be associated with primary data areas 21a to 21f in the data disks 20a to 20f, respectively. Meanwhile, backup data $B_1$ to B6 are made to be associated with backup data areas 22b, 22c, 22d, 22e, 22f, and 22a in the adjacent data disks 20b, 20c, 20d, 20e, 20f, and 20a, respectively.

The storage device 1 shown in FIG. 8 also includes a cache memory 30a, a cache memory 30b, and a cache memory 30c. The cache memories 30a to 30c have a configuration similar to that of the cache memories 30a, 30b shown in FIG. 2 except that the former data disks are three and types of data are six in number. The same reference numbers are thus given to the former components as the latter ones, and description thereof is omitted herefrom where appropriate.

It is assumed herein that a data for which a write request or a read request is made is previously made to be associated with the cache memories 30a to 30c as appropriate. Also, the data placement control unit 15 shown in FIG. 1 provides control of writing a data from outside to the appropriate cache memory 30.

As shown in FIG. 9, for example, if a write request of the write data $P_1$ is made from outside, the data placement control unit 15 performs a processing of storing the data $P_1$ in the primary data area 31a in the cache memory 30a and a processing of storing the data $B_1$ (=the data $P_1$) in the backup data area 32b in the cache memory 30b. Similarly to those processings, if a write request of the write data $P_2$ is made from outside, the data placement control unit 15 performs a processing of storing the data $P_2$ in the primary data area 31a in the cache memory 30a and a processing of storing the data $B_2$ (=the data $P_2$) in the backup data area 32c in the cache memory 30c.

If, for example, the primary data area 31a in the cache memory 30a shown in FIG. 8 is focused on, the data $P_1$ and the data $P_2$ both as primary data but different from each other are stored therein. The data $P_1$ is a data that is stored in the primary data area 21a in the data disk 20a. Meanwhile, the data $P_2$ is a data that is stored in the primary data area 21b in the data disk 20b. As just described, the cache memory 30a stores memory cache data in the data disks 20a, 20b as two nodes, in the primary data area 31a.

Similarly, if the backup data area 32a in the cache memory 30a is focused on, a data B4 and a data $B_5$ both as backup data but different from each other are stored therein. The data B4 is a data that is stored in the backup data area 22e in the data disk 20e. Meanwhile, the data $B_5$ is a data that is stored in the backup data area 22f in the data disk 20f. As just described, the cache memory 30a stores memory cache data in the data disks 20e, 20f as two nodes, in the backup data area 32a. In other words, the backup data area 32a in the cache memory 30a has a cache unit of 2.

In sum, the cache memory 30a stores a data in the data disk 20 with two nodes on each of the primary layer side and the backup layer side. Similarly, each of the cache memories 30b, 30c stores a data in the data disk 20 with two nodes on each of the primary layer side and the backup layer side. In other words, the storage device shown in FIG. 8 has the cache unit of 2.

In the example shown in FIG. 8, if the number of cache unit (to be hereinafter referred to as $N_0$) is more than one, the number may be three or more. Further, in FIG. 8, the number of the data disks 20 of the storage device 1 is six, and the number of the cache memories 30 is three. However, a generalized description is made below assuming that the respective numbers are just plural. Next is described a correspondence relationship between a case of the generalization and, for example, the storage device shown in FIG. 8.

<Relationship on Primary Side>

A relationship on the primary side is applied to the primary data processing of the write processing.

With respect to the relationship on the primary side, a cache memory unit i=1 includes the data $P_1$ and the data $P_2$ stored in the primary data area 31a in the cache memory 30a.

The cache unit i=2 includes the data $P_3$ and the data $P_4$ stored in the primary data area 31b in the cache memory 30b.

The cache unit i=3 includes the data $P_5$ and the data $P_6$ stored in the primary data area 31c in the cache memory 30c.

The order of data by node in the cache unit i is identified by an identification mark "j" (j=1, 2) and each data in the cache memory 30 on the primary side is specified by "ij".

With respect to the relationship on the primary side, a disk unit l=1 includes the data disks 20a, 20b.

The disk unit l=2 includes the data disks 20c, 20d.

The disk unit l=3 includes the data disks 20e, 20f. The order of data disks in the disk unit 1 is identified by an identification mark "j" (j=1,2) and a data disk if the primary side thereof is focused on is specified by "ij".

<Relationship on Backup Side>

The relationship on the backup side is applied to the backup data processing of the write processing. Thus, an identification mark specified according to the relationship on the backup side is handled independently from the identification mark specified according to the relationship on the primary side.

With respect to the backup side, the cache unit k=1 includes the data $B_4$ and the data $B_5$ stored in the backup data area 32a in the cache memory 30a.

The cache unit k=2 includes the data $B_1$ and the data $B_6$ stored in the backup data area 32b in the cache memory 30b.

The cache unit k=3 includes the data $B_2$ and the data $B_3$ stored in the backup data area 32c in the cache memory 30c.

The order of data by node in the cache unit k is identified by an identification mark "l" (l=1, 2) and each data in the cache memory 30 on the backup side is specified by "kl".

With respect to the relationship on the backup side, the disk unit m=1 includes the data disks 20a, 20b.

The disk unit m=2 includes the data disks 20c, 20d.

The disk unit m=3 includes the data disks 20e, 20f.

The order of data disks in the disk unit m is identified by an identification mark "n" (n=1, 2) and a data disk if the backup side is focused on is specified by "mn".

[5-2. Primary Data Processing of Write Processing]

In a storage device having the cache unit of more than one, as the storage device shown in FIG. 8, an entire flow of the write processing includes the primary data processing and the backup data processing as shown in FIG. 3. However, the processing performed by the storage device of FIG. 8 is different from that performed by the storage device of FIG. 2. Thus, in a case of the storage device of FIG. 8, the primary data processing is represented as step S100B and the backup data processing is represented as step S200B.

Figure 11:
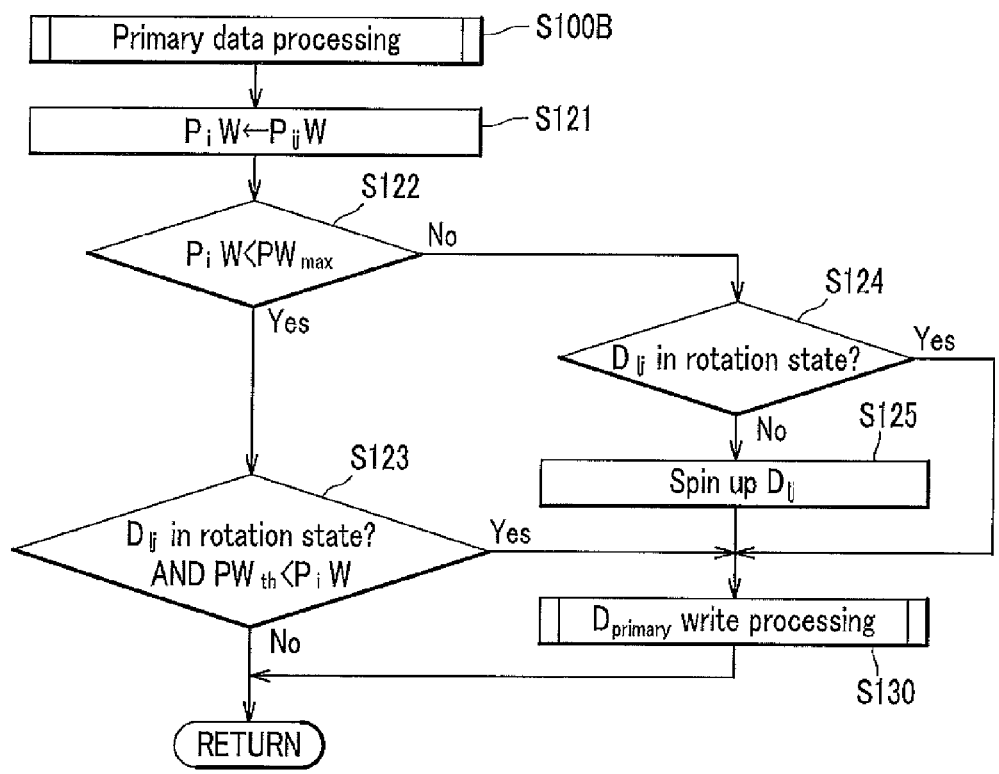
FIG. 11 is a flowchart illustrating an entire flow of a primary data processing in the storage device of FIG. 8 according to the embodiment.

The primary data processing of step S100B is described next with reference to FIG. 11 (see FIG. 1, FIG. 4, and FIG. 8 where necessary). FIG. 11 is a flowchart illustrating an entire flow of the primary data processing in the storage device of FIG. 8.

The following is assumed herein: The identification marks of the relationship on the primary side are used; And, in the primary data processing (step S100B) if the cache unit is more than one, a j-th data queue $P_{ij}W$ of a primary layer data queue in an i-th cache unit is specified. The primary layer data queue $P_{ij}W$ is stored in the cache memory 30 on the primary side and is a write data to a j-th data disk $D_{lj}$ of an l-th disk unit.

In the primary data processing (step S100B), as shown in FIG. 11, if the cache memory capacity detection unit 141 of the system management unit 10 writes the j-th primary layer data queue $P_{ij}W$ of the i-th cache unit, the cache memory capacity detection unit 141 detects a memory capacity of a queue $P_iW$ of the entire i-th cache unit (primary data) (step S121).

Steps S122 to S125 performed by the system management unit 10 are similar to steps S102 to S105 described above (see FIG. 4A) except that a data disk whose rotation state is detected in the former steps is different from that in the latter, and description is omitted herefrom where appropriate. The data disk whose rotation state is detected herein is the j-th data disk $D_{lj}$ of the l-th disk unit corresponding to the i-th cache unit.

If any one of the following conditions is satisfied, the system management unit 10 advances the processing to step S130. The conditions are that: in step S123, the data disk $D_{lj}$ is in the rotation state, and at the same time, a queue length of the primary layer data queue $P_iW$ is larger than a threshold $PW_{th}$ (step S123: Yes); in step S124, the data disk $D_1$ is in the rotation state (step S124: Yes); and after step S125 is completed.

<$D_{Primary}$ Write Processing in Step S130>

Figure 12:
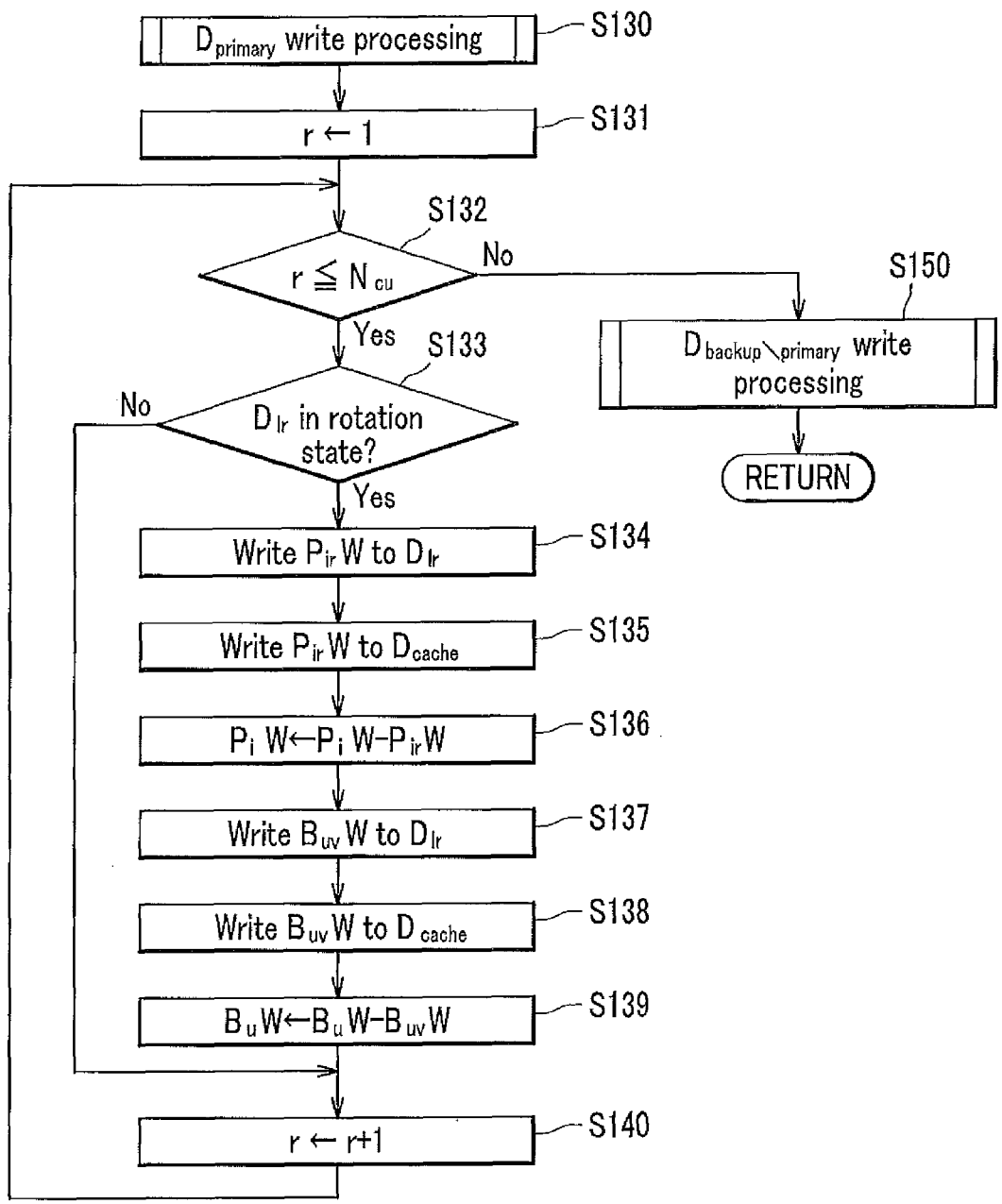
FIG. 12 is a flowchart illustrating the $D_{Primary}$ write processing of FIG. 11 according to the embodiment.

Next is described a $D_{primary}$ write processing of step S130 with reference to FIG. 12 (see FIG. 10 where necessary). As shown in FIG. 12, the data placement control unit 15 sets a default value of a variable r used for taking a repeat count, at "1" (step S131). The data placement control unit 15 determines whether or not a current value of the variable r is equal to or smaller than the number of nodes $N_{cu}$ whose nodes constitute the cache unit (step S132). Note that, in the example shown in FIG. 8, the number of nodes $N_{cu}$ whose nodes constitute the cache unit is "2".

In step S132, if the current value of the variable r is equal to or smaller than the number of nodes $N_{cu}$ (step S132: Yes), the data placement control unit 15 determines whether or not the data disk $D_{lr}$ is in the rotation state (step S133). If the data disk $D_{lr}$ is in the rotation state (step S133: Yes), the data placement control unit 15 writes an r-th primary layer data queue $P_{ir}W$ in the i-th cache unit stored in the cache memory, to the corresponding data disk $D_{lr}$ (primary layer) (step S134) and then writes the $P_{ir}W$ to the cache disk $D_{cache}$ (step S135). At this time, if r=1, the data placement control unit 15 writes, for example, the data $P_1$ which has been placed first of the data stored in the primary data area 31a in the cache memory 30a shown in the left of FIG. 10A, to the primary data area 21a in the data disk 20a.

The data placement control unit 15 then removes the r-th primary layer data queue $P_{ir}W$ which has already been written to the data disk, from a buffer (current value) of the primary layer data queue $P_iW$ of the i-th cache unit (step S136). At this time, if r=1 and if, for example, the data $P_1$ which has been placed first is removed from the primary data area 31a shown in the left of FIG. 10A, the data $P_2$ is left in the primary data area 31a as shown in the left of FIG. 10B.

The data placement control unit 15 then writes a memory cache data $B_{uv}W$ corresponding to the backup layer data in the data disk $D_{lr}$ to which the primary layer has been written (a v-th backup layer data queue in a u-th cache unit), to the data disk $D_{lr}$ (backup layer) (step S137). At this time, if r=1 and also if the data $P_1$ is written to the primary data area 21a in the data disk 20a as shown in the left of FIG. 10A, the data $B_6$ which has been stored in the second place in the backup data area 32b in the cache memory 30b, to the backup data area 22a in the data disk 20a as shown in the right of FIG. 10A.

The data placement control unit 15 then writes the $B_{uv}W$ which has been written to the data disk $D_{lr}$ (backup layer), to the cache disk $D_{cache}$ (step S138). The data placement control unit 15 removes the v-th backup layer data queue $B_{uv}W$ which has already been written to the disk, from a buffer (current value) of the backup layer data queue $B_uW$ in a cache unit corresponding to the backup layer data in the data disk $D_{lr}$ (step S139). At this time, if r=1 and if the data $B_6$ which has been stored in the second place in the backup data area 32b shown in the right of FIG. 10A is removed, the data $B_1$ is left in the backup data area 32b as shown in the right of FIG. 10B.

The data placement control unit 15 then adds "1" to the current value of the variable r (step S140) and returns the processing to step S132.

In step S133 described above, if the data disk $D_{lr}$ is not in the rotation state (step 133: No), the data placement control unit 15 skips step S134 to step S139 described above and advances the processing to step S140.

In step S132 described above, if the current value of the variable r is larger than the number of nodes $N_{cu}$ (step S132: No), the data placement control unit 15 performs a $D_{backup\backslash primary}$ write processing of step S150 and returns the processing to step S121 of FIG. 11.

<$D_{backup\backslash primary}$ Write Processing of Step S150>

Figure 13:
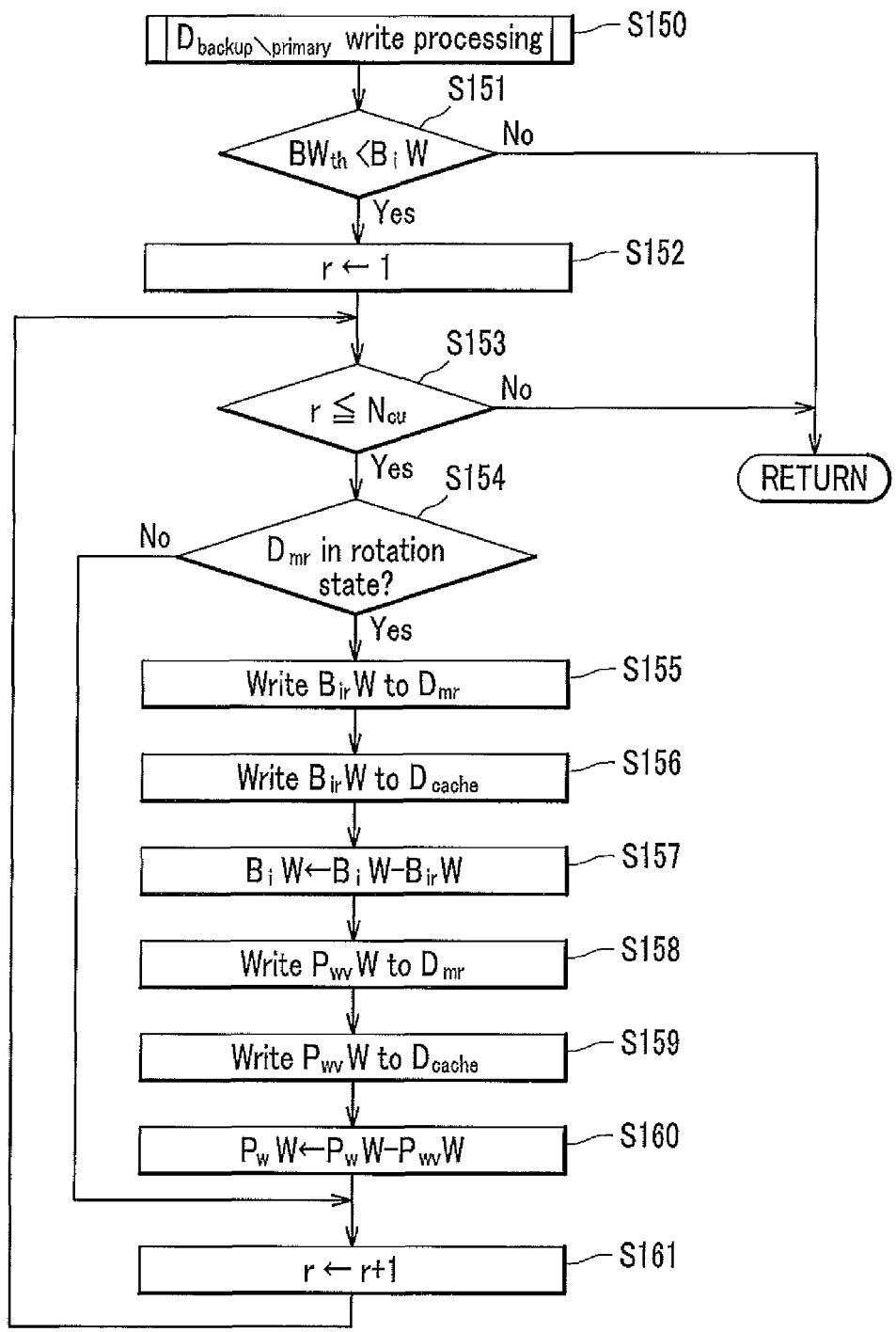
FIG. 13 is a flowchart illustrating a $D_{backup\backslash primary}$ write processing write processing of FIG. 12 according to the embodiment.

Next is described the $D_{backup\backslash primary}$ write processing of step S150 with reference to FIG. 13 (see FIG. 10 and FIG. 11 where necessary). As shown in FIG. 13, the data placement control unit 15 determines whether or not a queue length of the backup layer data queue $B_iW$ in the i-th cache unit to which the primary data processing (S100B) is performed is larger than a queue size threshold $BW_{th}$ in the backup layer data queue (step S151).

In step S151, note that an identification mark i is used instead of an identification mark k showing the relationship on the backup side. Also note that, to be more specific, the backup layer data queue $B_iW$ corresponds to a data as follows. If, for example, prior to the processing of step S150, a processing of writing the data $P_1$ stored in the primary data area 31a in the cache memory 30a shown in FIG. 10A, to a disk is performed, the backup layer data queue $B_iW$ corresponds to a data queue in the backup data area 32a.

In step S151, if the queue length of the backup layer data queue $B_iW$ is larger than the threshold $BW_{th}$ (step S151: Yes), the data placement control unit 15 sets a default value of the variable r for taking a repeat count, at "1" (step S152). The data placement control unit 15 then determines whether a current value of the variable r is equal to or smaller than the number of nodes $N_{cu}$ whose nodes constitute the cache unit (step S153). If the current value of the variable r is equal to or smaller than the number of nodes $N_{cu}$ (step S153: Yes), the data placement control unit 15 determines whether or not an r-th data disk $D_{mr}$ of an m-th disk unit which corresponds to a backup layer data in the i-th cache unit is in the rotation state (step S154).

In step S154, note that identification marks m, r showing the relationship on the backup side are used. Also note that, if the backup layer data queue $B_iW$ is a data queue in the backup data area 32a shown in FIG. 8, the data disk $D_{mr}$ is, if r=1, the data disk 20e, and, if r=2, the data disk 20f.

In step S154 described above, if the data disk $D_{mr}$ is in the rotation state (step S154: Yes), the data placement control unit 15 writes an r-th backup layer data queue $B_{ir}W$ in an i-th cache unit stored in the cache memory, to the data disk $D_{mr}$ (backup layer) corresponding thereto (step S155). For example, the data placement control unit 15 writes the data B4 stored in the backup data area 32a shown in FIG. 8, to the backup data area 22e in the data disk 20e.

The data placement control unit 15 then writes the $B_{ir}W$ written to the data disk $D_{mr}$ (backup layer), to the cache disk $D_{cache}$ (step S156). The data placement control unit 15 removes the r-th backup layer data queue $B_{ir}W$ having already been written to the data disk, from a buffer (current value) of the backup layer data queue $B_iW$ in the i-th cache unit (step S157).

The data placement control unit 15 then writes a memory cache data $P_{wv}W$ corresponding to a primary layer data in the data disk $D_{mr}$ to which the backup layer has been written (a v-th primary layer data queue in a w-th cache unit), to the data disk $D_{mr}$ (primary layer) (step S158). For example, if the data placement control unit 15 writes the data B4 stored in the backup data area 32a shown in FIG. 8, to the backup data area 22e in the data disk 20e, the data placement control unit 15 writes the data P5 stored in the primary data area 31c in the cache memory 30c, to the primary data area 21e in the data disk 20e.

The data placement control unit 15 then writes the $P_{wv}W$ having been written to the data disk $D_{mr}$ (primary layer), to the cache disk $D_{cache}$ (step S159). The data placement control unit 15 then removes the v-th primary layer data queue $P_{wv}W$ having already been written to the disk, from a buffer (current value) of the primary layer data queue $P_wW$ of a cache unit corresponding to the primary layer data in the data disk $D_{mr}$ (step S160). The data placement control unit 15 adds "1" to a current value of the variable r (step S161) and returns the processing to step S153.

In step S154 described above, if the data disk $D_{mr}$ is not in the rotation state (step 154: No), the data placement control unit 15 skips step S155 to step S160 described above and advances the processing to step S161.

In step S153 described above, if the current value of the variable r is larger than the number of nodes $N_{cu}$ (step S153: No), or if, in step S151 described above, the queue length of the backup layer data queue $B_iW$ is equal to or smaller than the threshold $BW_{th}$ (step S151: No), the data placement control unit 15 returns the processing to step S121 of FIG. 11.

[5-3. Backup Data Processing of Write Processing]

Figure 14:
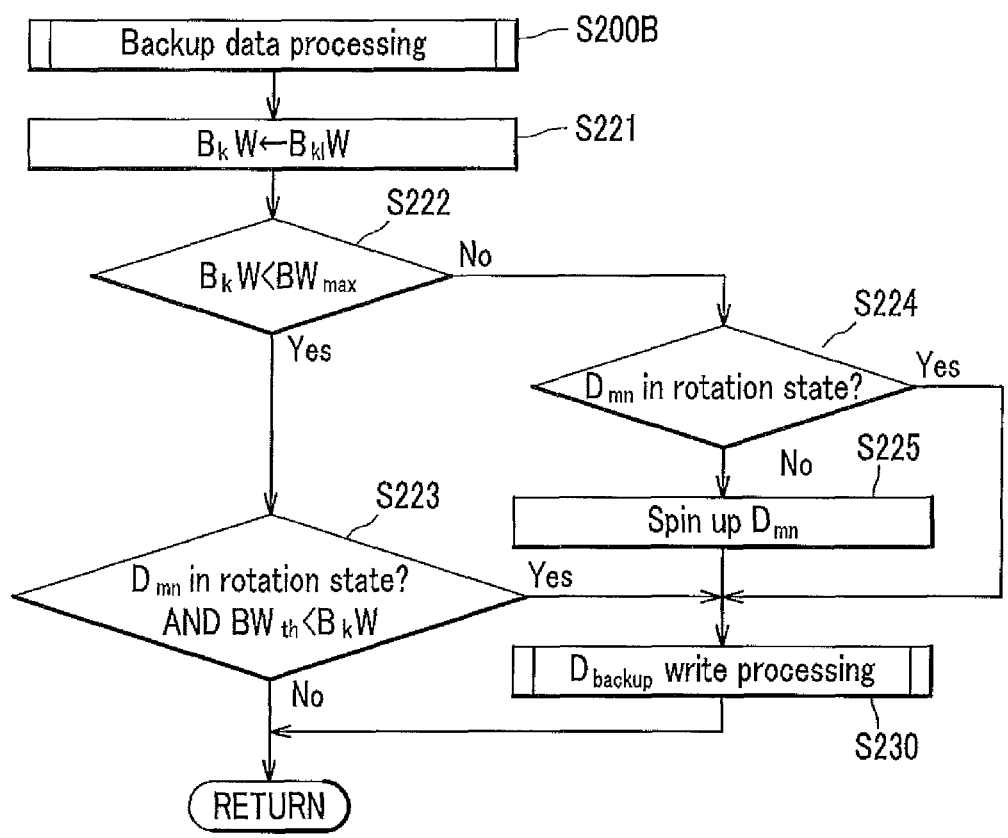
FIG. 14 is a flowchart illustrating an entire flow of a backup data processing in the storage device of FIG. 8 according to the embodiment.

Next is described a backup data processing of step S200B with reference to FIG. 14 (see FIG. 1, FIG. 5, and FIG. 8 where necessary). FIG. 14 is a flowchart illustrating an entire flow of the backup data processing in the storage device of FIG. 8.

The following is assumed herein: The identification marks of the relationship on the backup side are used; And, in the backup data processing (step S200B) if the cache unit is more than one, an l-th backup layer data queue $B_{kl}W$ of a k-th cache unit is specified as a backup of the j-th primary data queue $P_{ij}W$ of the i-th cache unit. The backup layer data queue $B_{kl}W$ is stored in the cache memory 30 on the backup side and is a write data to an n-th data disk $D_{mn}$ of an m-th disk unit.

In the backup data processing (step S200B), as shown in FIG. 14, if the cache memory capacity detection unit 141 of the system management unit 10 writes the l-th backup layer data queue $B_{kl}W$ of the k-th cache unit stored in the cache memory 30 on the backup side, the cache memory capacity detection unit 141 detects a memory capacity of a queue $B_kW$ of the entire k-th cache unit (backup data) (step S221).

Steps S222 to S225 performed by the system management unit 10 are similar to steps S202 to S205 described above (see FIG. 5A) except that a data disk whose rotation state is detected in the former steps is different from that in the latter, and description is omitted herefrom where appropriate. The data disk whose rotation state is detected herein means the n-th data disk $D_{mn}$ of the m-th disk unit corresponding to the k-th cache unit.

If, in step S223, any one of the following conditions is satisfied, the system management unit 10 advances the processing to step S230. The conditions are that: the data disk $D_{mn}$ is in the rotation state and the queue length of the backup layer data queue $B_kW$ is larger than the $BW_{th}$ (step S223: Yes); in step S224, the data disk $D_{mn}$ is in the rotation state (step S224: Yes), and after step S225 is completed.

<$D_{Backup}$ Write Processing of Step S230>

Figure 15:
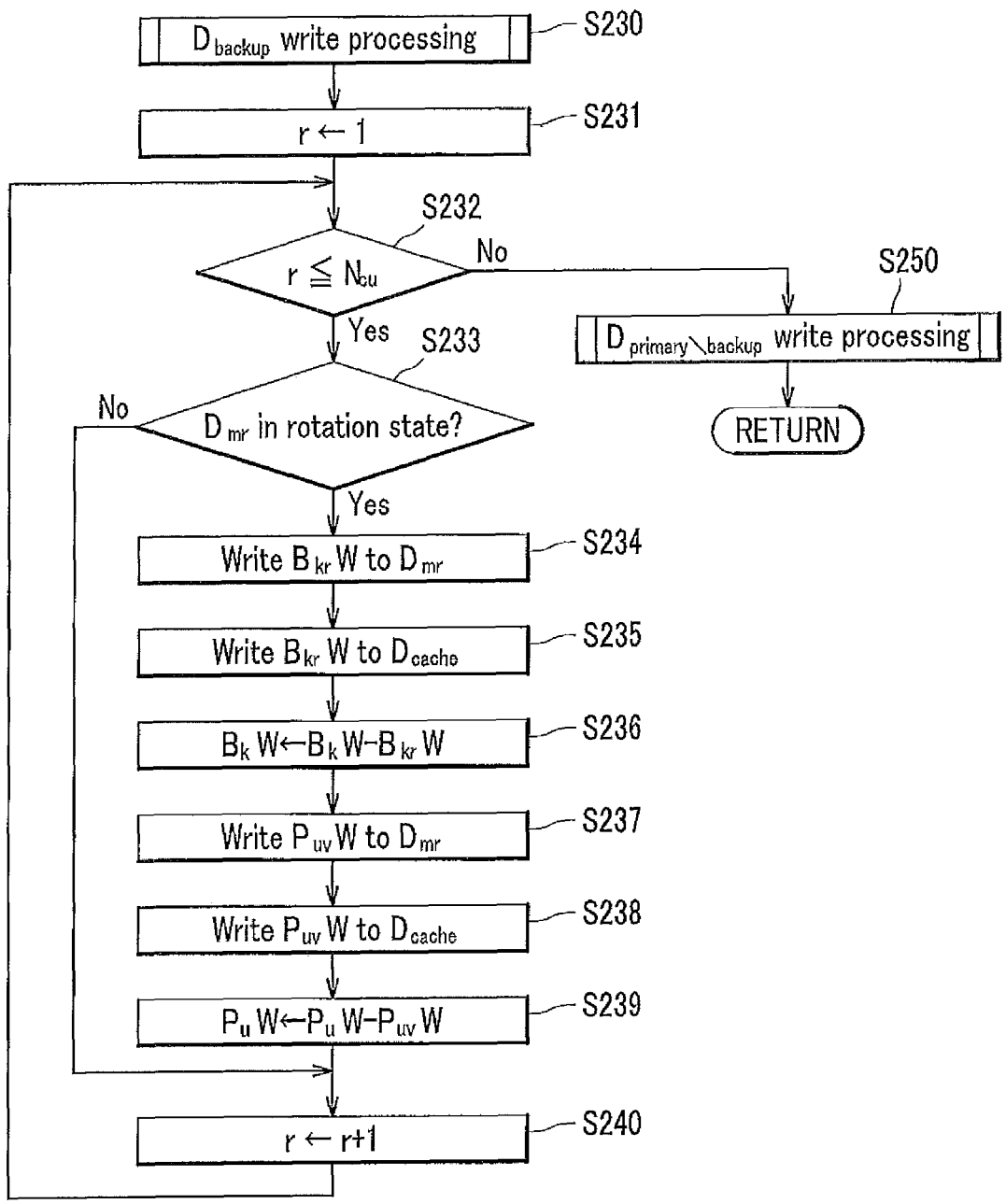
FIG. 15 is a flowchart illustrating the $D_{Backup}$ write processing of FIG. 14 according to the embodiment.

Next is described a $D_{primary}$ write processing of step S230 with reference to FIG. 15 (see FIG. 10 where necessary). As shown in FIG. 15, the data placement control unit 15 sets a default value of a variable r used for taking a repeat count, at "1" (step S231). The data placement control unit 15 determines whether or not a current value of the variable r is equal to or smaller than the number of nodes $N_{cu}$ whose nodes constitute the cache unit (step S232). If the current value of the variable r is equal to or smaller than the number of nodes $N_{cu}$ (step S232: Yes), the data placement control unit 15 determines whether or not the data disk $D_{mr}$ is in the rotation state (step S233).

In step S233, if the data disk $D_{mr}$ is in the rotation state (step S233: Yes), the data placement control unit 15 writes the r-th backup layer data queue $B_{kr}W$ of the k-th cache unit stored in the cache memory, to the corresponding data disk $D_{mr}$ (backup layer) (step S234).

At this time, if, for example, the data $P_1$ in the cache memory 30a shown in the left of FIG. 10A has already been written to the primary data area 21a in the data disk 20a in the previously-performed primary processing, and also if r=1, the data placement control unit 15 writes the first-placed data $B_1$ stored in the backup data area 32b in the cache memory 30b, to the backup data area 22b in the data disk 20b.

The data placement control unit 15 then writes the $B_{kr}W$ having been written to the data disk $D_{mr}$ (backup layer), to the cache disk $D_{cache}$ (step S235) and removes the r-th backup layer data queue $B_{kr}W$ having already been written to the disk, from a buffer (current value) of the backup layer data queue $B_kW$ of the k-th cache unit (step S236).

The data placement control unit 15 then writes a memory cache data $P_{uv}W$ corresponding to the primary layer data of the data disk $D_{mr}$ to which the backup layer is written (the v-th primary layer data queue of an u-th cache unit), to the data disk $D_{mr}$ (primary layer) (step S237). For example, if the data placement control unit 15 has already written the data $B_1$ from the cache memory 30b shown in the right of FIG. 10A, to the backup data area 22b in the data disk 20b, the data placement control unit 15 writes the data $P_2$ which is stored in the second position in the primary data area 31a in the cache memory 30a, to the primary data area 21b in the data disk 20b.

The data placement control unit 15 then writes the $P_{wv}W$ having been written to the data disk $D_{mr}$ (primary layer), to the cache disk $D_{cache}$ (step S238) and removes the v-th primary layer data queue $P_{wv}W$ having already been written to the disk, from a buffer (current value) of the primary layer data queue $P_uW$ of a cache unit corresponding to the primary layer data in the data disk $D_{mr}$ (step S239). The data placement control unit 15 adds "1" to the current value of the variable r (step S240) and returns the processing to step S232.

In step S233 described above, if the data disk $D_{mr}$ is not in the rotation state (step 233: No), the data placement control unit 15 skips step S234 to step S239 described above and advances the processing to step S240.

In step S232 described above, if the current value of the variable r is larger than the number of nodes $N_{cu}$ (step S232: No), the data placement control unit 15 performs a $D_{primary\backslash backup}$ write processing of step S250 and returns the processing to step S221 of FIG. 14.

<$D_{primary\backslash backup}$ write processing of step S250>

Figure 16:
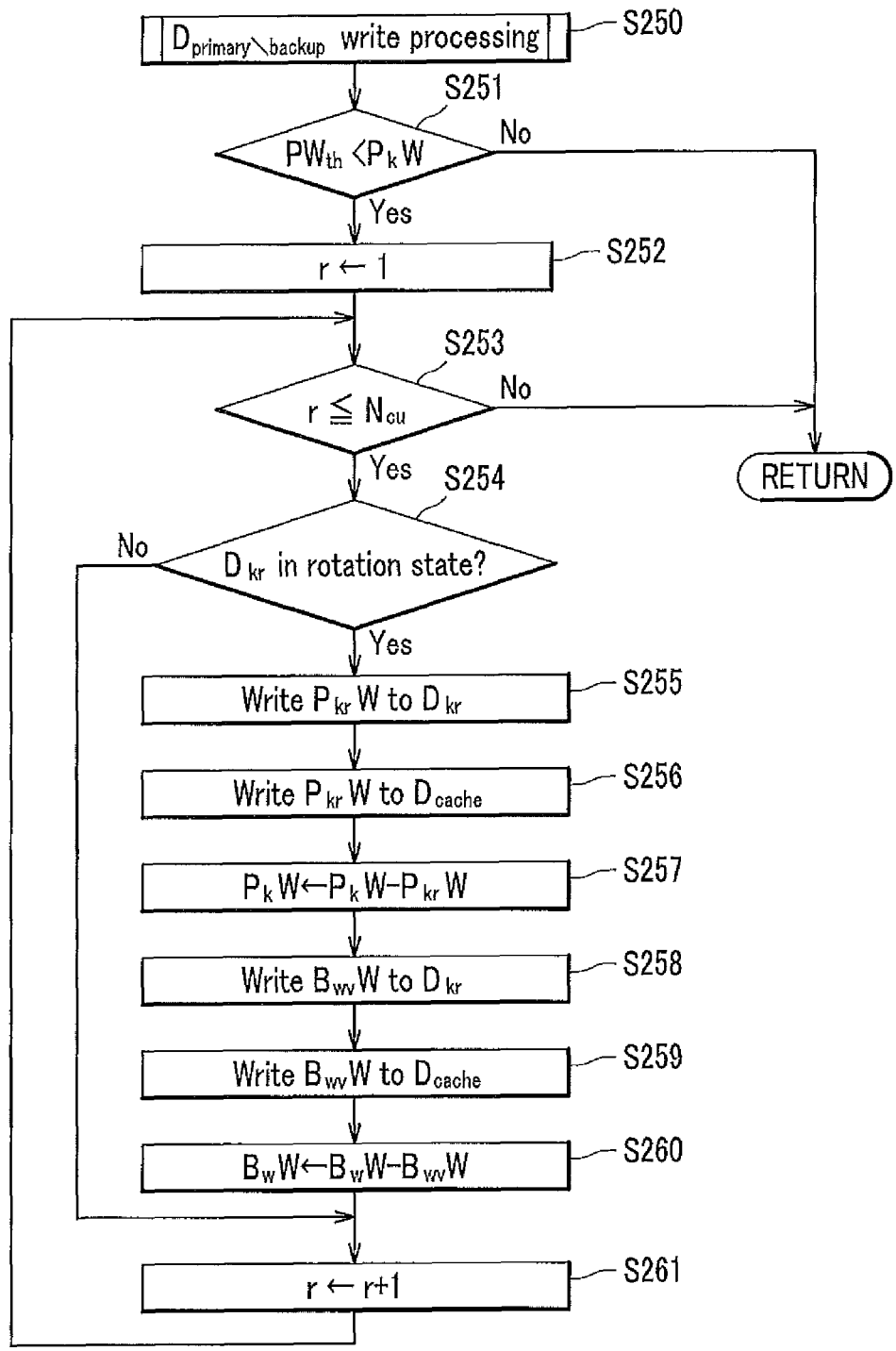
FIG. 16 is a flowchart illustrating the $D_{primary\backslash backup}$ write processing of FIG. 15 according to the embodiment.

Next is described the $D_{primary\backslash backup}$ write processing of step S250 with reference to FIG. 16 (see FIG. 10 and FIG. 14 where necessary). As shown in FIG. 16, the data placement control unit 15 determines whether or not a queue length of the primary layer data queue $P_kW$ of the k-th cache unit to which the backup data processing (S200B) is performed is larger than a queue size threshold $PW_{th}$ in the primary layer data queue (step S251).

In step S251, note that the identification mark k is used instead of the identification mark "i" representing the relationship on the primary side. Also note that, to be more specific, the primary layer data queue $P_kW$ corresponds to the data as follows. If, for example, prior to the processing of step S250, a processing of writing the data $B_1$ stored in the backup data area 32b in the cache memory 30b shown in FIG. 10A, to a disk is performed, the primary layer data queue $P_kW$ is the data queue in the primary data area 31b.

In step S251, if the queue length of the primary layer data queue $P_kW$ is larger than the threshold $PW_{th}$ (step S251: Yes), the data placement control unit 15 sets a default value of the variable r for taking a repeat count, at "1" (step S252). The data placement control unit 15 then determines a current value of the variable r is equal to or smaller than the number of nodes $N_{cu}$ whose nodes constitute the cache unit (step S253). If the current value of the variable r is equal to or smaller than the number of nodes $N_{cu}$ (step S253: Yes), the data placement control unit 15 determines whether or not an r-th data disk $D_{kr}$ of a k-th disk unit which corresponds to a primary layer data of the k-th cache unit is in the rotation state (step S254).

Note that, with respect to a relationship between a cache unit and a disk unit on the primary side, an identification mark of the cache unit is identical to an identification mark of a disk unit corresponding thereto. In step S254, the cache unit and the disk unit of interest are both in the k-th position. If, for example, the primary layer data queue $P_kW$ is a data queue in the primary data area 31b shown in FIG. 8, and if r=1, the data disk $D_{kr}$ is the data disk 20c, and if r=2, the data disk 20d.

In step S254 described above, if the data disk $D_{kr}$ is in the rotation state (step S254: Yes), the data placement control unit 15 writes an r-th primary layer data queue $P_{kr}W$ of the k-th cache unit stored in the cache memory, to the corresponding data disk $D_{kr}$ (primary layer) (step S255). For example, the data placement control unit 15 writes the data P3 stored in the primary data area 31b shown in FIG. 8, to the primary data area 21c in the data disk 20c.

The data placement control unit 15 writes the $P_{kr}W$ having been written to the data disk $D_{kr}$ (primary layer), to the cache disk $D_{cache}$ (step S256). The data placement control unit 15 then removes the r-th primary layer data queue $P_{kr}W$ having already been written to the disk, from a buffer (current value) of the primary layer data queue $P_kW$ of the k-th cache unit (step S257).

The data placement control unit 15 then writes a memory cache data $B_{wv}W$ corresponding to the backup layer data of the data disk $D_{kr}$ to which the primary layer having been written (a backup layer data queue of a v-th cache unit), to the data disk $D_{kr}$ (backup layer) (step S258). For example, if the data placement control unit 15 writes the data P3 stored in the primary data area 31b shown in FIG. 8, to the primary data area 21c in the data disk 20c, the data placement control unit

15 writes the data "B$_2$" in the backup data area 32c in the cache memory 30c, to the backup data area 22c in the data disk 20c.

The data placement control unit 15 writes the B$_{wv}$W having been written to the data disk D$_{kr}$ (backup layer), to the cache disk D$_{cache}$ (step S259). The data placement control unit 15 then removes the v-th backup layer data queue B$_{wv}$W having already been written to the disk, from a buffer (current value) of the backup layer data queue B$_w$W of the cache unit corresponding to a backup layer data of the data disk D$_{kr}$ (step S260). The data placement control unit 15 adds "1" to a current value of the variable r (step S261) and returns the processing to step S253.

In step S254 described above, if the data disk D$_{kr}$ is not in the rotation state (step 154: No), the data placement control unit 15 skips step S255 to step S260 described above and advances the processing to step S261.

In step S253 described above, if the current value of the variable r is larger than the number of nodes N$_{cu}$ (step S253: No), or if, in step S251 described above, the queue length of the primary layer data queue P$_k$W is equal to or smaller than a threshold PW$_{th}$ (step S251: No), the data placement control unit 15 returns the processing to step S221 of FIG. 14.

[5-4. Read Processing]

Figure 18:
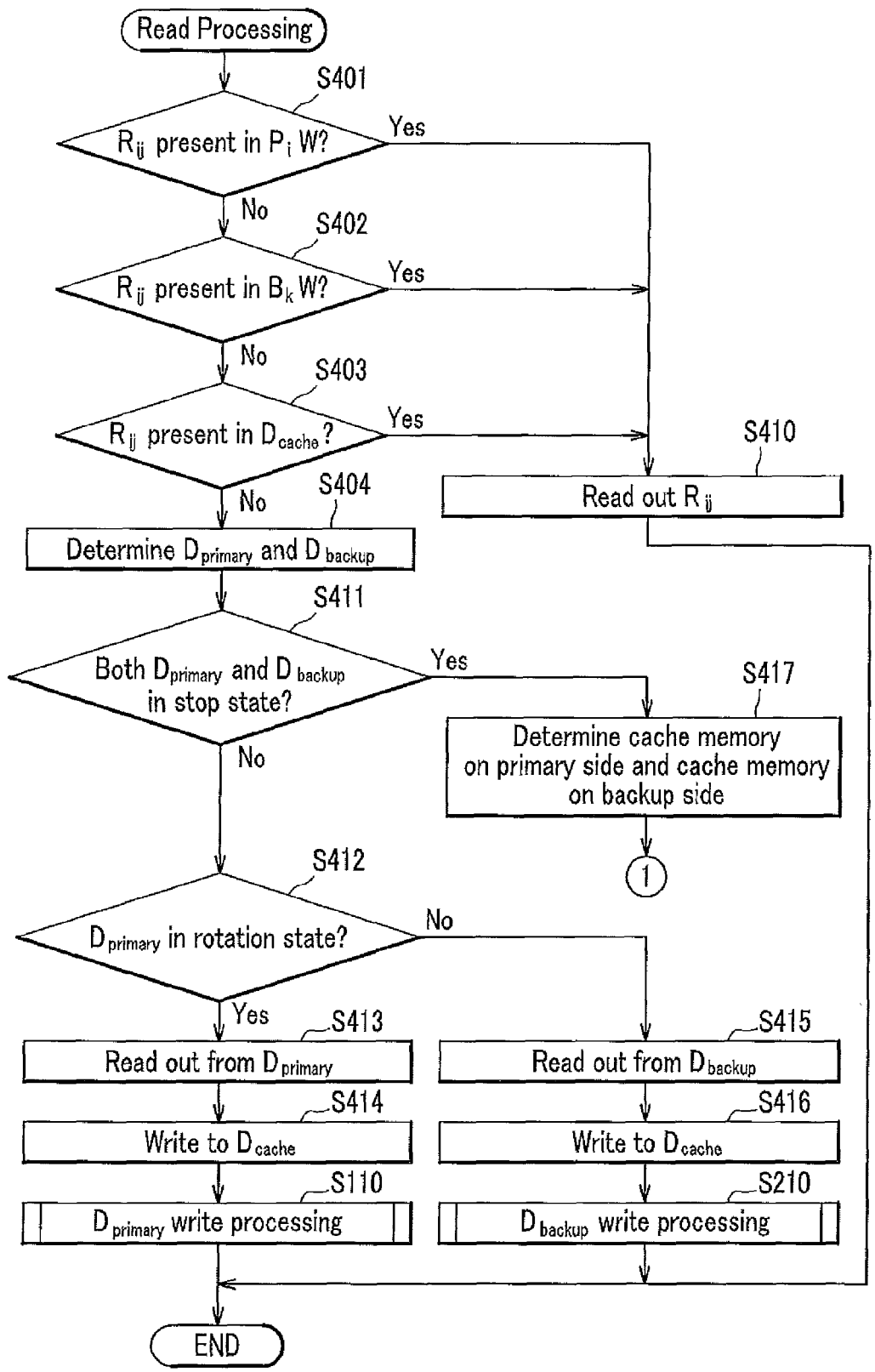
FIG. 18 is a flowchart illustrating a read processing in the storage device of FIG. 8 according to the embodiment and is to be continued to FIG. 7.

FIG. 18 is a flowchart illustrating an entire flow of a read processing in the storage device having the cache unit of more than one, as the storage device FIG. 8. As shown in FIG. 18, steps S401 to S403 and S410 performed by the system management unit 10 are similar to steps S301 to S303 and S310 described above (see FIG. 6) except that a data as a read target is herein R$_{ij}$, and description is omitted herefrom where appropriate.

The data R$_{ij}$ as the read target represents that an original data is stored in a j-th data disk D$_{ij}$ of an l-th disk unit corresponding to an i-th cache unit. For example, in the example shown in FIG. 8, if i=1 and j=1, the data R$_{ij}$ corresponds to the data P$_1$.

Thus, if the data R$_{ij}$ as the read target is not present in the cache disk D$_{cache}$ (step S403: No), the data placement control unit 15 of the system management unit 10 references a database not shown for managing each of the data disks 20 in view of a disk unit, determines a data disk on the primary side and a data disk on the backup side as shown in FIG. 17 (step S404), and then advances the processing to a determination step of step S411.

Figure 17:
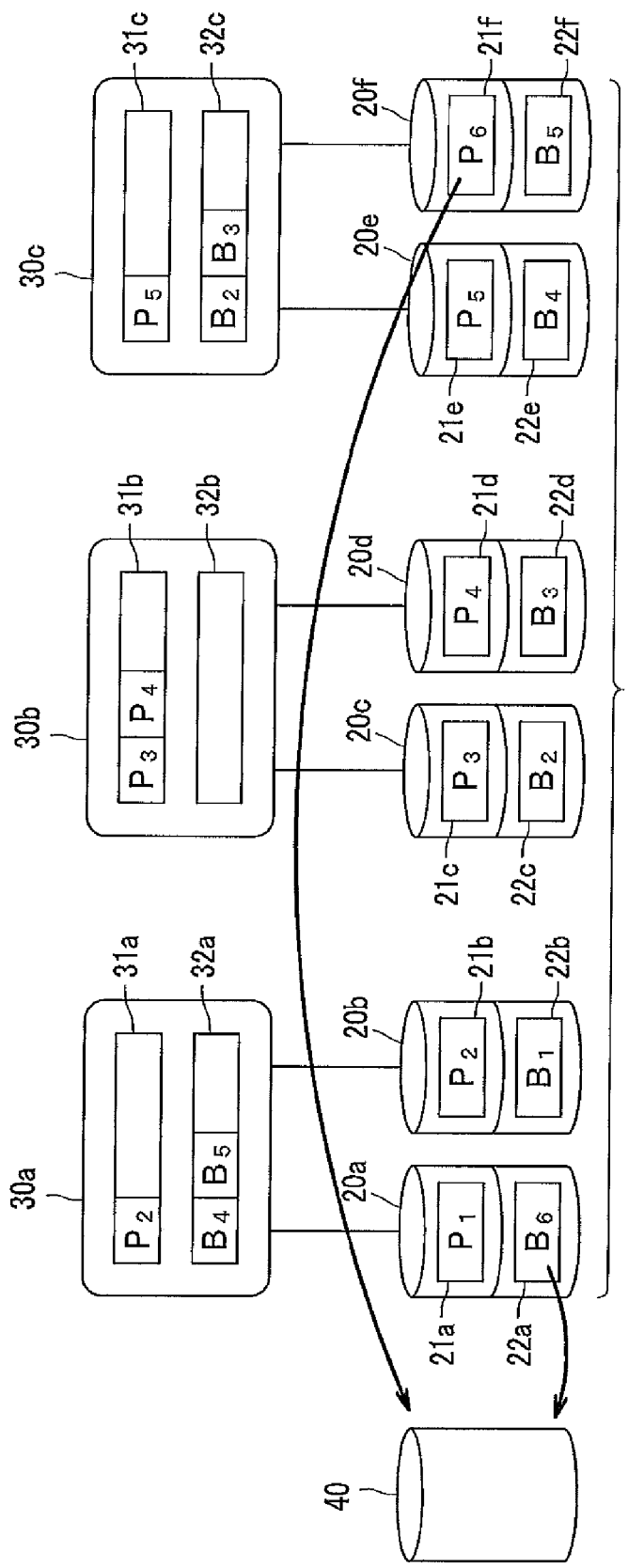
FIG. 17 is an explanatory diagram schematically illustrating the storage device of FIG. 8 in a case where a read request of a data is made from a network and the data is not present in a cache disk according to the embodiment.

The example illustrated in FIG. 17 shows a case in which a read request is made to the data P$_6$ stored in the primary data area 21f in the data disk 20f. In this case, the data P$_6$ is present neither in the cache memories 30 nor in the cache disk 40. Therefore a mishit occurs and an appropriate data is read out from the data disk 20. Then, an appropriate data disk on the primary side is determined to be the data disk 20f, and an appropriate data disk on the backup side is determined to be the data disk 20a. In a subsequent step, the data placement control unit 15 copies the appropriate data from either one of the appropriate data disks 20 in the rotation state into the cache disk 40.

Note that, if the cache unit is one, though omitted from FIG. 6, the data placement control unit 15 references a database not shown in no view of a disk unit and determines an appropriate data disk on the primary side and an appropriate data disk on the backup side.

As shown in FIG. 18, steps S411 to S416 performed by the system management unit 10 are similar to steps S311 to S316 described above (see FIG. 6), and description is omitted herefrom.

However, the data placement control unit 15 of the system management unit 10 references a database not shown for managing each of the cache memories 30 in view of a cache unit, determines a cache memory on the primary side and a cache memory on the backup side (step S417), and advances the processing to a determination of step S321 (see FIG. 7).

Note that, if the cache unit is one, though omitted in FIG. 6, the data placement control unit 15 references a database not shown in no view of a cache unit and determines a cache memory on the primary side and a cache memory on the backup side.

As described above in detail in chapters 1 to 5, the storage device 1 and a control method for the same according to this embodiment make it possible to ensure a rotation stop state of the data disk 20 either on the primary side or on the backup side with regard to a prescribed data for a long time period and to reduce the numbers of times of starting a spinup and switching to a rotation stop of each of the data disks 20. Thus, in the storage device 1 according to this embodiment, many data disks 20 are kept in the rotation stop state, which can ensure performance and save electric power.

One embodiment of the present invention has been explained above. However, the present invention is not limited to this and can be carried out with various modifications and variations without departing from the gist of the present invention.

[Variation 1]

In this embodiment, the description has been made assuming that the normal rotation stop state of the data disk 20 is a rotation stop state. However, the normal rotation stop state may be a low speed rotation state, instead of the rotation stop state. If a rotation of the data disk 20 is completely stopped, it is advantageous in that steady-state power consumption is not necessary. In this case, however, a delay occurs from when the rotation of the data disk 20 is resumed until when the data disk 20 is in a disk idle state (in which the data disk 20 is rotating at a normal rotation speed but is not writing nor reading), and spike current is generated. Meanwhile, if the data disk 20 is in a low speed rotation state, a time required from the low speed rotation state to the disk idle state as well as the power consumed during the time are reduced. That is, the low speed rotation state is more preferable from viewpoint of performance or power saving of the storage device.

The rotation speed in the low speed rotation state as lower as possible than the normal rotation speed is desirable from viewpoint of power saving. In the meantime, an excessively low rotation speed is not necessary from viewpoint of reducing degradation of performance by making a response time shorter at the time of spinup. Also, there is a trade-off relationship between a power consumption obtained from a rotation at a low speed and a time loss from when an access is made until when the rotation is performed at a maximum speed (a normal rotation speed). A rotation speed suitable for the rotation at a low speed also depends on an access (read/write) frequency to a data disk. Thus, the rotation speed at a low rotation speed can be changed according to necessity, based on a difference in priority between the power consumption and the time required for returning to the normal rotation speed or how to operate a use condition or the like.

As an example, the relation between a normal rotation speed and a low rotation speed may be configured such that the two numbers correspond one-to-one and that the low rotation speed is set at approximately 60% of the maximum rotation speed, as well-known in the field of storage. In the field of storage, for example, a technique has been proposed in which the low rotation speed is switched in multi-rotation speed according to access frequency such that the low rotation speed is changed to correspond to 30 to 95% of the maximum rotation speed. As in this case, the maximum rotation speed and the low rotation speed may correspond one-to-many.

[Variation 2]

In this embodiment, if the cache unit is FIG. 8, for example, if "No" in step S122 (see FIG. 11) and the data disk $D_j$ is in the rotation stop state, a prespecified data disk corresponding to the j-th data queue $P_{ij}W$ of the primary layer data queue in the i-th cache unit is spun up (step S125). However, the configuration of the present invention is not limited to this.

That is, instead of prespecifying the data disk spun up in step S125, a data disk corresponding to a cache data having the largest queue length of $N_{cu}$ pieces of memory cache data between $P_{i1}$ to $P_{iNcu}$ which are present in the data queue $P_iW$ including the $P_{ij}W$ may be spun up. In this case, a data queue of the cache memory 30 can be effectively reduced.

[Variation 3]

Figure 19:
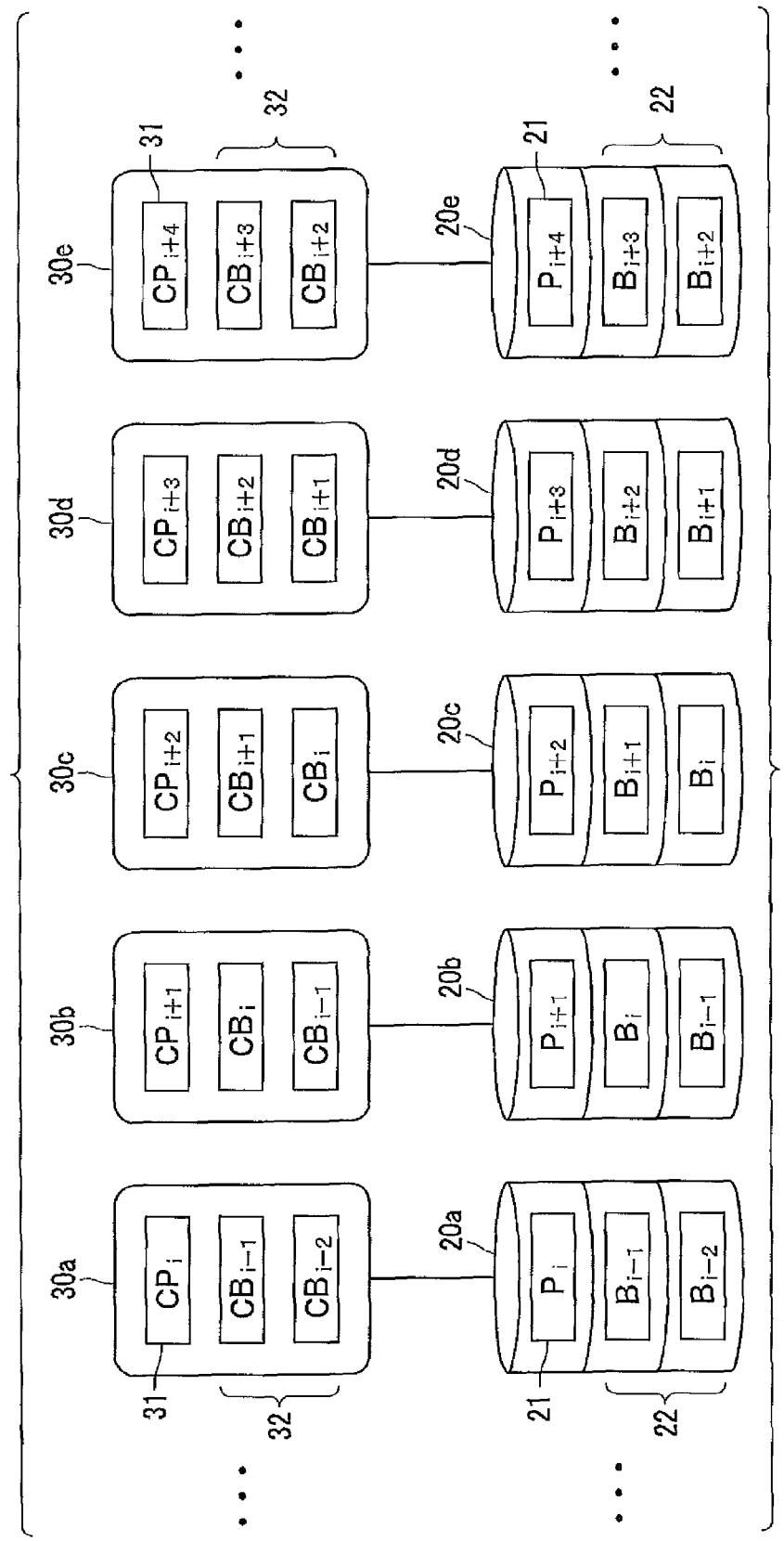
FIG. 19 is an explanatory diagram schematically illustrating the storage device of FIG. 1 in a case where a cache unit is one, and a cache memory stores therein a plurality of backup data with respect to one primary data, according to the embodiment.

In this embodiment, the description has been made assuming that the cache memory 30 is logically divided into one primary data area and one backup data area. However, another configuration is also possible in which the cache memory 30 is logically divided into one primary data area and a plurality of backup data areas. As one example, a case where a storage device has a cache unit of one, and a cache memory stores therein two backup data for each primary data is schematically shown in FIG. 19. It is needless to say that a configuration of partitioning the cache memory 30 into one primary data area and three or more backup data areas is also possible.

The cache memory 30a shown in FIG. 19 is divided into one primary data area 31 and two backup data areas 32. In the primary data area 31 in the cache memory 30a, a data $CP_i$ is stored as a memory cache data stored in the data disk 20a as a primary data. In one of the backup data areas 32 in the cache memory 30a, a data $CB_{i-1}$ is stored as a memory cache data for being stored as a backup data in the data disk 20a. Similarly, in the other of the backup data areas 32, a data $CB_{i-2}$ is stored. With the configuration of the cache memory 30 as described above a data can be multiplexed, thus allowing reliability to be further improved.

In this case, a backup data (data $CB_i$) of the data $CP_i$ stored in the primary data area 31 of the cache memory 30a is stored in both the backup data area 32 in the cache memory 30b and the backup data area 32 in the cache memory 30c. Thus, for example, even if the data $CB_i$ stored in the backup data area 32 in the cache memory 30b is deleted in the backup data processing (step S200), the data $CB_i$ stored in the backup data area 32 in the cache memory 30c can be left unremoved for a certain period of time by not deleting the data $CB_i$ in the cache memory 30c at the same time when the data $CB_i$ in the cache memory 30b is deleted.

[Variation 4]

In this embodiment, the description has been made assuming that, in the storage device 1, one system management unit 10 controls a plurality of the data disks 20. However, the present invention is not limited to this. For example, a system management unit is installed for each data disk, to thereby build a configuration in which a storage device includes a plurality of autonomous storage devices and serves as an autonomous storage system as a whole. In this case, a copy or a transfer of data can be performed based on a prescribed distributed autonomous management rule, while the plural autonomous storage devices cooperate with one another.

[Variation 5]

In this embodiment, the description has been made assuming that the storage device 1 includes the system management unit 10, the data disk 20, the cache memory 30, and the cache disk 40. However, the present invention is not limited to this. For example, if not so much importance is given to a stable read processing, the cache disk 40 may be omitted from the configuration. Or, for example, if importance is given only to a stable read processing and not to a stable write processing, the cache memory 30 may be omitted from the configuration. Further, a simple configuration only including the data disk 20 and the system management unit is also possible.

If, for example, the storage device includes the system management unit 10, the data disk 20, and the cache memory 30, some of the operations of the storage device described above are changed as below.

In the operations of the storage device whose cache unit is one in the primary data processing (step S100) of the write processing, the data placement control unit 15 skips step S113 and step S116. In the backup data processing (step S200), the data placement control unit 15 skips step S213 and step S216. In the read processing, the data placement control unit 15 skips steps S303, S314, S316, S324, S328, and S334.

In the operations of the storage device if the cache unit is more than one, in the primary data processing (step S100B) of the write processing, the data placement control unit 15 skips steps S135, S138, S156, and S159. In the backup data processing (step S200B), the data placement control unit 15 skips steps S235, S238, S256, and S259. In the read processing, the data placement control unit 15 skips steps S414, S416, S324, S328, and S334. As described above, if the storage device does not include the cache disk 40, processings can be simplified.

EXAMPLE

In order to demonstrate advantageous effects of the present invention, computer simulation for verifying performance of the storage device of the present invention was carried out.

(Experimental Method)

In this Example, a storage device of the present invention was configured to include the system management unit, the data disk 20, the cache memory 30, and the cache disk 40 and provide control of stopping as many data disks 20 as possible by the control method described above. An experiment was conducted for estimating an effect of reducing power consumption of the storage device of the present invention, compared to a conventional storage device. The conventional storage device used herein had a configuration in which the cache memory 30 and the cache disk 40 were not included, all of the data disk 20 were constantly in the rotation state, and a specific control as that of the Example was not provided. Table 1 lists explanations of symbols used in expressions below.

TABLE 1

| Symbols | Explanations |
| --- | --- |
| n | number of cache disks |
| m | number of data disks |
| $P_{standby}$ | disk power consumption in normal rotation stop state |
| $P_{idle}$ | disk power consumption in idle state |
| $P_{tran}$ | disk power consumption in transition from normal rotation stop state to idle state |
| $P_{read}$ | disk power consumption in active state (read) |
| $P_{write}$ | disk power consumption in active state (write) |
| $P_{dataDisc}$ | total power consumption of data disks |
| $P_{cacheDisc}$ | total power consumption of cache disks |
| $P_{normal}$ | total power consumption of entire storage according to conventional technique |
| $h_c$ | hit ratio in cache memory to read access |

TABLE 1-continued

| Symbols | Explanations |
|---|---|
| $h_d$ | hit ratio in cache disk to read access |
| $b_w$ | writable rate to write access |
| $r_d$ | probability that disk is rotating at the time of access to disk |

(Expression for Calculation)

The storage device according to the embodiment was configured to include m units of the data disks 20 and n units of cache disks 40. In this case, a power consumption $P_{dataDisk}$ of all of the m units of the data disks 20 of the storage device according to the embodiment was calculated by Expression (1).

[Expression (1)]

$$P_{dataDisk}=m(h_cf_r+(1-h_c)h_df_r+b_wf_w+(1-(f_r+f_w)))(r_d \cdot P_{idle}+(1-r_d)P_{standby})+f_rm(1-h_c)(1-h_d)(r_dP_{read}+(1-r_d)(P_{read}+P_{tran}))+f_wm(1-b_w)(r_dP_{write}+(1-r_d)(P_{write}+P_{tran}))$$

Expression (1)

In Expression (1), fr and fw represent a read access frequency and a write access frequency, respectively. The $f_r$ and $f_w$ are each indicated by a ratio between 0 and 1 ($0 \le f_r \le 1$, $0 \le f_w \le 1$). An access to the data disk 20 can be classified into a read event, a write event, and other events. If all accesses are associated with a read event or a write event, $f_r+f_w$ is 1.

The first term of the right side of Expression (1) corresponds to a power consumption in a case where there is no access to the data disk 20 on writing, on reading, and whenever else. The second term of the right side of Expression (1) corresponds to a power consumption used for a read directly from the data disk 20 in a case where, on reading, a cache mishit occurs both in the cache memory 30 and in the cache disk 40. The third term of the right side of Expression (1) corresponds to a power consumption used for a write directly to the data disk 20 in a case where, on writing, a queue length of the cache memory 30 is larger than a threshold.

Further, in the case described above, a power consumption $P_{cacheDisk}$ of all of the n units of the constantly-rotating cache disks 40 of the storage device according to the embodiment was calculated by Expression (2).

[Expression (2)]

$$P_{cacheDisk}=n(h_cf_r+(1-f_r))P_{idle}+f_rn(1-h_c)h_dP_{read}+f_rn(1-h_c)(1-h_d)P_{write}+f_wn(1-b_w)P_{write}$$

Expression (2)

The first term of the right side of Expression (2) corresponds to a power consumption in a case where there is a hit to the cache memory 30 or where a read processing itself does not occur. The second term of the right side of Expression (2) corresponds to a power consumption in a case where a mishit occurs in the cache memory 30 and there is a hit in the cache disk 40. The third term of the right side of Expression (2) corresponds to a power consumption in a case where, if there is no hit even in the cache disk 40, an appropriate data is read from the data disk 20, and the data is written to the cache disk 40. The fourth term of the right side of Expression (2) corresponds to a power consumption in a case where, if a data is written to the data disk 20 with an overflow of a memory buffer of the cache memory 30, the data is written to the cache disk 40.

A power consumption $P_{total}$ of the entire storage device according to the embodiment was calculated by Expression (3), using the power consumption $P_{dataDisk}$ represented by Expression (1) and the power consumption $P_{cacheDisk}$ represented by Expression (2) described above.

[Expression (3)]

$$P_{total}=P_{dataDisk}+P_{cacheDisk}$$

Expression (3)

Expression (1) to Expression (3) are relational expressions which are previously determined in consideration that, if there is a hit, from where an appropriate data is read and that how a power consumption is used for each unit from which the data is read, using the read access frequency $f_r$, the write access frequency $f_w$, a hit ratio $h_c$ in a cache memory to a read access, a hit ratio $h_d$ in a cache disk to a read access, and a data writable rate $b_w$ to a write access. Note that it is assumed herein that, when a read request is made, if a data to be read in response to the read request is not present in the cache disk 40, the data is copied from the data disk 20 into the cache disk 40, from which the data is read. Also, when a write request is made, if there is a cache hit for a write access corresponding thereto, only the cache memory 30 is made to be operated, while the data disk 20 is kept in a stop state. It is not until data in the cache memory 30 is accumulated up to a certain level that the data disk 20 is spun up and the data is written thereto.

A storage device according to Comparative Example was configured to include m units of the data disks 20. A power consumption $P_{normal}$ thereof was calculated by Expression (4).

[Expression (4)]

$$P_{normal}=f_rmP_{read}+f_wmP_{write}+(1-(f_r+f_w))mP_{idle}$$

Expression (4)

Note that Comparative Example is greatly different from Example. That is, in an access for a write, immediately before the write, in Comparative Example, a power consumption for keeping the data disk 20 rotating is necessary. Meanwhile, in Example, the data disk 20 is normally in a stop state and, only when data in the cache memory 30 is accumulated up to a certain level, the data disk 20 is spun up and the data is written thereto.

(Conditions for Calculation)

Conditions herein were made such that the total sum of the number of units m of the data disks 20 and the number n of the cache disks 40 is 100 (m+n=100). A number of experiments under different conditions were conducted. Herein are presented three representative examples.

<Experiment A>

The breakdown of the total sum was set at m=90 and n=10. In this experimental simulation, parameters shown below were given as fixed values as follows. It was also assumed that a power consumption $P_{tran}$ used in a transition state was approximately twice as much as a power consumption used in a read or a write.

$P_{standby}$=0.8[W], $P_{idle}$=9.3[W], $P_{tran}$=24[W], $P_{read}$=13[W], $P_{write}$=13[W], $h_d$=0.95, $b_w$=1.0, $r_d$=0.2, $f_r$=0.7, $f_w$=0.2

Then, a total power consumption $P_{total}$ of the storage device 1 according to the embodiment was calculated each time the $h_c$ was changed by 5% between 70-95%. The power consumption $P_{normal}$ of the storage device 1 according to Comparative Example was also calculated, and to thereby calculate a power consumption reduction rate (($P_{normal}-P_{total}$)/$P_{normal}$).

<Experiment B>

The breakdown of the total sum was set at m=80 and n=20 and a power consumption reduction rate was calculated under the same calculation condition as that of the above.

<Experiment C>

The breakdown of the total sum was set at m=70 and n=30, and one of the parameters was changed such that $f_w$=0.3

($f_r+f_w=1$). Then, a power consumption reduction rate was calculated under the same calculation condition as that of the above except the aforementioned parameter change.
(Experimental Results)

Experimental results of Experiment A (m=90 and n=10) are shown in Table 2.

Experimental results of Experiment B (m=80 and n=20) are shown in Table 3.

Experimental results of Experiment C (m=70, n=30, and $f_w=0.3$) are shown in Table 4.

TABLE 2

| No. | n | m | hc | $P_{total}$ | Power Consumption Reduction Rate [%] |
|---|---|---|---|---|---|
| A1 | 10 | 90 | 0.70 | 381.90 | 66.4 |
| A2 | 10 | 90 | 0.75 | 371.25 | 67.3 |
| A3 | 10 | 90 | 0.80 | 360.60 | 68.3 |
| A4 | 10 | 90 | 0.85 | 349.95 | 69.2 |
| A5 | 10 | 90 | 0.90 | 339.30 | 70.2 |
| A6 | 10 | 90 | 0.95 | 328.65 | 71.1 |

Power Consumption of Comparative Example given M = 90, $P_{normal}$ = 1136.7[W]

TABLE 3

| No. | n | m | hc | $P_{total}$ | Power Consumption Reduction Rate [%] |
|---|---|---|---|---|---|
| B1 | 20 | 80 | 0.70 | 460.78 | 55.7 |
| B2 | 20 | 80 | 0.75 | 448.32 | 56.9 |
| B3 | 20 | 80 | 0.80 | 435.86 | 58.1 |
| B4 | 20 | 80 | 0.85 | 423.39 | 59.3 |
| B5 | 20 | 80 | 0.90 | 410.93 | 60.5 |
| B6 | 20 | 80 | 0.95 | 398.46 | 61.7 |

Power Consumption of Comparative Example given M = 80, $P_{normal}$ = 1040.0 [W]

TABLE 4

| No. | n | m | hc | $P_{total}$ | Power Consumption Reduction Rate [%] |
|---|---|---|---|---|---|
| C1 | 30 | 70 | 0.70 | 520.97 | 42.8 |
| C2 | 30 | 70 | 0.75 | 509.81 | 44.0 |
| C3 | 30 | 70 | 0.80 | 498.65 | 45.2 |
| C4 | 30 | 70 | 0.85 | 487.48 | 46.4 |
| C5 | 30 | 70 | 0.90 | 476.32 | 47.7 |
| C6 | 30 | 70 | 0.95 | 465.16 | 48.9 |

Power Consumption of Comparative Example given M = 70, $P_{normal}$ = 910 [W]

Effects of reducing power consumption were recognized in all cases shown in Table 2 to Table 4. Note that such an assumption is made herein that a disk of Comparative Example is constantly rotating, and a disk of Example is occasionally moved and stopped. If stops and restarts of rotation are frequently repeated, this may necessarily cost more than a constant rotation. In this case, the power consumption reduction rate takes a negative value.

The power consumption reduction rates greatly vary depending on the read access frequency $f_r$ or the write access frequency $f_w$ as shown in Table 2 to Table 4. Comparing, for example, the results of Table 2 to the results of Table 3, the power consumption reduction rate in the former case wherein n=10 is larger than that in the latter wherein n=20. The power consumption reduction rates also greatly vary depending on the hit ratio $h_c$ of a cache memory to a read access, the hit ratio $h_d$ of a cache disk to a read access, and a ratio of the read access frequency $f_r$ to the write access frequency $f_w$.

The power consumption reduction rate also greatly vary depending on a ratio between the number n of the cache disks 40 and the number m of the data disks 20. In particular, a maximum of 71.1[%] of the power saving can be achieved as shown in No. A6 of Table 2, if the storage device of Example includes a 10-20% of the number of the cache disks 40 of the total disk number; access data has a locality at a high level; and the hit ratio $h_c$ in the cache memory to a read access is very high, as shown in Table 2 and Table 3.

As shown in Table 4, even if the number n of the cache disks 40 is set at 30, a 40[%] or more of the power saving can be achieved as the case may be. Note that, if the number n of the cache disks 40 is equal to or more than the number m of the data disks 20, advantageous effects of the present invention are relatively reduced because cost of the cache disk 40 is higher than that of the data disk 20.

The hit ratio $h_c$ in the cache memory to a read access $h_c$ was herein changed by 5% between 70-95%. However, an optimum value thereof depends on, for example, an application, a type of a data stored in the data disk 20, or the like. For example, if both a large number of pages of a blog to which a large number of users make access and a few pages of the blog to which a few users make access are stored in the data disk 20, the $h_c$ becomes high. In this case, it is particularly desirable that the control method according to the embodiment is applied to.

Note that, on writing, because a hit ratio in the cache memory 30 (the writable rate $b_w$ to a write access) is high, more processings can be done by the cache memory 30. Accordingly, fewer accesses to the data disk 20 are required. This enables the data disk 20 to be stopped for a longer time, thus enabling a larger effect of cost saving. Therefore, if the ratio of the read access frequency $f_r$ to the write access frequency $f_w$ is changed, to thereby relatively reduce the read access frequency $f_r$, a cost saving effect by a write processing is increased.

DESCRIPTION OF REFERENCE NUMERALS 1 storage device
2 network
10 system management unit
11 communication transmission/reception unit
12 data storage unit
121 data reception unit
122 data write unit
13 data distribution unit
131 data read unit
132 data transmission unit
14 data management unit
141 cache memory capacity detection unit
142 disk rotation state detection unit
143 disk rotation state control unit
15 data placement control unit
20 data disk
20a-20f data disk
21 primary data
21a-21f primary data area
22 backup data
22a-22f backup data area
30 cache memory
30a-30e cache memory
31 primary data
31a-31e primary data area
32 backup data
32a-32e backup data area
40 cache disk
41 primary data
42 backup data

The invention claimed is:

1. A storage system comprising:
a plurality of data disks, each of which is made up of a disk whose storage area is logically divided into one primary data area and one or more backup data areas;
a plurality of cache memories, each having a storage area logically divided into one primary data area and one or more backup data areas; and
a system management unit that is configured to provide control of storing a data, for which a write request or a read request is made, in one of the data disks, into the primary data area in the one of the data disks and also storing the data into the backup data area of at least one of the other data disks,
wherein the system management unit comprises:
a cache memory capacity detection unit that detects a current queue length for tasks to be performed in the cache memory and also detects a status of a current memory capacity by comparing the detected queue length with a prescribed first threshold and a prescribed second threshold, the second threshold being smaller than the first threshold, for classifying the memory capacity into a plurality of statuses;
a disk rotation state detection unit that detects whether the data disk is rotating at a rotation speed in a normal rotation state or in a normal rotation stop state in which the data disk is either rotating at a prescribed low rotation speed lower than the normal rotation speed or stopped;
a disk rotation state control unit that switches a rotation state of the data disk between the normal rotation state and the normal rotation stop state; and
a data placement control unit that controls the plurality of data disks in such a manner that the data disks are normally kept in the normal rotation stop state as long as possible and also in such a manner that, if any one of the plurality of data disks selected in response to the write request or the read request is in the normal rotation stop state, the disk rotation state control unit switches the rotation state of the selected data disk to the normal rotation state, and that, if the selected data disk is in the normal rotation state, a data as a target for the write request is transferred to the selected data disk, or a data as a target for the read request is transferred from the selected data disk, and
wherein the data placement control unit is further configured to:
temporarily stores the data in the data disk selected in response to the write request, in a primary data area in the cache memory which has been associated with the data disk, and also stores a backup data of the data in a backup data area in at least one of the other cache memories;
if it is detected that a memory capacity corresponding to the queue length in the cache memory after the data is stored is larger than the prescribed first threshold: and also if the selected data disk is in the normal rotation state, then transfers the data to the data disk; or, also if the selected data disk is in the normal rotation stop state, then switches the rotation state of the selected data disk to the normal rotation state and transfers the data to the data disk;
if it is detected that the memory capacity corresponding to the queue length in the cache memory after the data is stored is smaller than the first threshold and is equal to or larger than the prescribed second threshold, and if the selected data disk is in the normal rotation state, then transfers the data to the data disk; also if the selected data disk is in the normal rotation stop state, then holds the data with no transferring; and,
if it is detected that the memory capacity corresponding to the queue length in the cache memory after the data is stored is smaller than the prescribed second threshold, then holds the data with no transferring.

2. The storage system according to claim 1,
wherein the data placement control unit is further configured to:
if a first data disk which is selected as a data disk on a primary side having a primary data area associated with the write target data is in the normal rotation stop state, sequentially performs processing's of: transferring the write target data which has been first stored in a primary data area in a first cache memory, into the primary data area in the first data disk; and transferring a data stored in a backup data area in a second cache memory associated with a backup data area in the first data disk, to the backup data area in the first data disk; and
if a second data disk which is selected as a data disk to which a backup data of the write target data is written is in the normal rotation state, sequentially performs processing's of: transferring the backup data of the write target data which has been first stored in a backup data area in the second cache memory, into a backup data area in the second data disk; and transferring a data stored in a primary data area in a third cache memory which is the first or the second cache memory or any other one of the plurality of cache memories associated with a primary data area in the second data disk, into the primary data area in the second data disk.

3. The storage system according to claim 1, wherein the data placement control unit is further configured to:
when the read request is made, if the read target data is present not in any cache memory on a primary side or in any cache memory on a backup side, but in a data disk on the primary side having a primary data area associated with the cache memory on the primary side or a data disk on the backup side having one or more backup data areas associated with the cache memory on the backup side, selects both the data disk on the primary side and the data disk on the backup side;
if either of the selected data disks is detected to be in the normal rotation stop state, preferentially accesses the data disk in the normal rotation state, and transfers the read target data from the data disk; and
when the read request is made, if both of the selected data disks on the primary side and on the backup side are detected to be in the normal rotation stop state, compares a total queue size for tasks to be performed of memory cache data in the cache memory on the primary side with a total queue size for tasks to be performed of memory cache data in the cache memory on the backup side, if the total queue sizes are not the same, then makes the disk rotation state control unit spin up either of the data disks having the total queue size larger than the other, and accesses the spun-up data disk; and, on the other hand, if the total queue sizes are the same, then makes the disk rotation state control unit spin up either of the data disks on the side which has a longer time period in the rotation stop state, accesses the spun-up data disk, and transfers the target read data from the data disk.

4. The storage system according to claim 1, further comprising a cache disk which is a read only disk which stores therein a copy of data, the data being an original data stored in the data disk, so as to stably perform a read processing,
wherein the data placement control unit copies a data stored in the data disk, stores the copied data in the cache disk, and, when the read request is made, reads out the read target data, preferentially from the cache disk rather than from the data disk.

5. A control method for a storage system which comprises: a plurality of data disks, each of which is made up of a disk whose storage area is logically divided into one primary data area and one or more backup data areas; a plurality of cache memories, each having a memory logically divided into one primary data area and one or more backup data areas; and a system management unit which is configured to provide control of storing a data, for which a write request or a read request is made, in one of the data disks, into the primary data area in the one of the data disks and also storing the data into a backup data area of at least one of the other data disks, the control method performed by the system management unit when the write request is made including:
a primary data processing in which, a data as a target for the write request is written, as a primary data, to a data disk on a primary side having a primary data area associated with the write target data; and
a backup data processing in which the write target data is written, as a backup data, to a data disk on a backup side having a backup data area associated with the data;
the control method at the primary data processing, comprising:
a step of temporarily storing the write target data in a primary data area in a first cache memory associated with a first data disk which is a data disk on the primary side;
a step of determining such conditions are satisfied that a memory capacity corresponding to a queue length for tasks to be performed in the cache memory after the data is stored is smaller than a prescribed first threshold and is equal to or larger than a prescribed second threshold, the second threshold being smaller than the first threshold, and at the same time, that the first data disk is in the normal rotation state;
a step of determining whether the first data disk is rotating at a rotation speed in a normal rotation state or in a normal rotation stop state in which the first data disk is either rotating at a prescribed low rotation speed lower than the normal rotation speed or stopped, if such a condition is satisfied that a memory capacity corresponding to the queue length in the cache memory after the data is stored is larger than the first threshold;
a step of switching the rotation state of the first data disk to the normal rotation state, if the memory capacity corresponding to the queue length is larger than the first threshold, and at the same time, if the rotation state thereof is the normal rotation stop state; and
a primary side write step of writing the data to the first data disk, if any of the conditions is satisfied, and at the same time, if the rotation state of the first data disk is the normal rotation state,
wherein the primary side write step comprises:
a step of storing the write target data stored in the primary data area in the first cache memory, into a primary data area in the first data disk; and
a step of storing a data which is associated with a backup data area in the first data disk, into the backup data area in the first data disk and is stored in a backup data area in a second cache memory, the control method at the backup data processing, comprising:
a step of temporarily storing the write target data as a backup of a data stored in the primary data area in the first cache memory, in a backup data area in a third cache memory which is the first or the second cache memory or any other one of the plurality of cache memories;
a step of determining such conditions are satisfied that a memory capacity corresponding to a queue length in the third cache memory after the data is stored is smaller than a prescribed third threshold and is equal to or larger than a prescribed fourth threshold, the fourth threshold being smaller than the third threshold, and at the same time, that a second data disk associated with the first data disk as a backup thereof is in the normal rotation state;
a step of determining whether a rotation state of the second data disk associated with the first data disk as a backup thereof is either the normal rotation state or the normal rotation stop state, if such a condition is satisfied that a memory capacity corresponding to the queue length in the third cache memory after the data is stored is larger than the third threshold;
a step of switching the rotation state of the second data disk to the normal rotation state, if the memory capacity corresponding to the queue length is larger than the third threshold, and at the same time, if the rotation state thereof is the normal rotation stop state; and
a backup side write step of writing the write target data to the second data disk, if any of the conditions is satisfied, and at the same time, if the rotation state of the second data disk is the normal rotation state,
wherein the backup side write step comprises:
a step of storing the write target data stored in a backup data area in the third cache memory, into a backup data area in the second data disk; and
a step of storing a data which is associated with a primary data area in the second data disk, into the primary data area in the second data disk and is stored in a primary data area in a fourth cache memory.

6. A control method for a storage system which comprises: a plurality of data disks, each of which is made up of a disk whose storage area is logically divided into one primary data area and one or more backup data areas; a plurality of cache memories, each having a memory logically divided into one primary data area and one or more backup data areas; a cache disk which is a read only disk storing therein a data which is a copy of an original data stored in the data disk, so as to stably perform a read processing; and a system management unit which is configured to provide control of storing a data, for which a write request or a read request is made, in one of the data disks, into the primary data area in the one of the data disks and also storing the data into a backup data area of at least one of the other data disks, the control method performed by the system management unit when the write request is made, including:
a primary data processing in which a data as a target for the write request is written, as a primary data, to a data disk on a primary side having a primary data area associated with the write target data; and
a backup data processing in which the write target data is written, as a backup data, to a data disk on a backup side having backup data area associated with the write target data, the control method at the primary data processing, comprising:
- a step of temporarily storing the write target data in a primary data area in a first cache memory associated with a first data disk which is a data disk on the primary side;
- a step of determining such conditions are satisfied that a memory capacity corresponding to a queue length for tasks to be performed in the cache memory after the data is stored is smaller than a prescribed first threshold and is equal to or larger than a prescribed second threshold, the second threshold being smaller than the first threshold, and at the same time, that the first data disk is in the normal rotation state;
- a step of determining whether the first data disk is rotating at a rotation speed in the normal rotation state or in a normal rotation stop state in which the first data disk is either rotating at a prescribed low rotation speed lower than the normal rotation speed or stopped, if such a condition is satisfied that the memory capacity corresponding to the queue length in the cache memory after the data is stored is larger than the first threshold;
- a step of switching the rotation state of the first data disk to the normal rotation state, if the memory capacity corresponding to the queue length is larger than the first threshold, and at the same time, if the rotation state thereof is the normal rotation stop state; and
- a primary side write step of writing the data to the first data disk, if any of the conditions is satisfied, and at the same time, if the rotation state of the first data disk is the normal rotation state, wherein the primary side write step comprises:
- a step of storing the write target data stored in the primary data area in the first cache memory, into a primary data area in the first data disk;
- a step of storing a copy of the data stored in the primary data area in the first data disk, into the cache disk;
- a step of storing a data stored in a backup data area in a second cache memory in which a data associated with a backup data area in the first data disk is stored, into the backup data area in the first data disk; and
- a step of storing a copy of the data associated with the backup data area in the first data disk, in the cache disk, the control method at the backup data processing comprising:
- a step of temporarily storing the write target data as a backup of a data stored in the primary data area in the first cache memory, in a backup data area in a third cache memory which is the first or the second cache memory or any other one of the plurality of cache memories;
- a step of determining such conditions are satisfied that a memory capacity corresponding to a queue length in the third cache memory after the data is stored is smaller than a prescribed third threshold and is equal to or larger than a prescribed fourth threshold, the fourth threshold being smaller than the third threshold, and at the same time, that a second data disk associated with the first data disk as a backup thereof is in the normal rotation state;
- a step of determining whether a rotation state of the second data disk associated with the first data disk as a backup thereof is either the normal rotation state or the normal rotation stop state, if such a condition is satisfied that the memory capacity corresponding to the queue length in the third cache memory after the data is stored is larger than the third threshold;
- a step of switching the rotation state of the second data disk to the normal rotation state, if the queue length is larger than the third threshold, and at the same time, if the rotation state thereof is the normal rotation stop state; and
- a backup side write step of writing a data to the second data disk, if any of the conditions is satisfied, and at the same time, if the rotation state thereof is the normal rotation state, wherein the backup side write step comprises:
- a step of storing the write target data stored in a backup data area in the third cache memory, into a backup data area in the second data disk;
- a step of storing a copy of the data stored in a backup data area in the second data disk, in the cache disk;
- a step of storing a data stored in a primary data area in a fourth cache memory which is the first or the second or the third cache memory or any other one of the plurality of cache memories in which a data associated with a primary data area in the second data disk is stored, into the primary data area in the second data disk; and
- a step of storing a copy of the data associated with the primary data area in the second data disk, into the cache disk.

7. A control method for a storage system which comprises: a plurality of data disks, each of which is made up of a disk whose storage area is logically divided into one primary data area and one or more backup data areas; a plurality of cache memories, each having a memory logically divided into one primary data area and one or more backup data areas; and a system management unit which is configured to provide control of storing a data, for which a write request or a read request is made, in one of the data disks, into the primary data area in the one of the data disks and also storing the data into the backup data area of at least one of the other data disks, the control method performed by the system management unit when the read request is made, comprising:
- a step of determining whether or not a data as a target for the read request is present in a primary data area in a fifth cache memory associated with the read target data;
- a step of determining, if the read target data is not present in the primary data area in the fifth cache memory, whether or not the read target data is present in a backup data area in a sixth cache memory, as a backup of the read target data stored into the primary data area in the fifth cache memory;
- a step of determining, if the read target data is not present in the backup data area in the sixth cache memory, whether or not both a data disk on the primary side associated with the read target data stored in the primary data area in the fifth cache memory, and a data disk on the backup side corresponding to the read target data stored into the backup data area in the sixth cache memory are each rotating in a normal rotation stop state in which the data disk is either rotating at a prescribed low rotation speed lower than a prescribed normal rotation speed, or is stopped;
- a step of comparing a total queue size for tasks to be performed of memory cache data in the fifth cache memory, with a total queue size for tasks to be performed of memory cache data in the sixth cache memory, if both the data disk on the primary side and the data disk on the backup side are in the normal rotation stop state;

a step of spinning up, if the total queue sizes are not the same, either of the data disks having the total queue size larger than the other, up to a normal rotation state in which the data disk is rotating at the normal rotation speed, and reading out the read target data from the data disk;

a step of spinning up, if the total queue sizes are the same, either one of the data disks that stays in the rotation stop state longer than the other, up to the normal rotation state, and reading out the read target data from the data disk; and a step of reading out, if either of the data disk on the primary side and the data disk on the backup side is in the normal rotation stop state, the read target data from the data disk in the normal rotation state.

8. A control method for a storage system which comprises: a plurality of data disks, each of which is made up of a disk whose storage area is logically divided into one primary data area and one or more backup data areas; a plurality of cache memories, each having a memory logically divided into one primary data area and one or more backup data areas; a cache disk which is a read only disk storing therein a copy of data, the data being an original data stored in the data disk, so as to stably perform a read processing; and a system management unit which is configured to provide control of storing a data, for which a write request or a read request is made, in one of the data disks, into the primary data area in the one of the data disks and also storing the data into a backup data area of at least one of the other data disks, the control method performed by the system management unit when the read request is made, comprising:

a step of determining whether or not a data as a target for the read request is present in a primary data area in a fifth cache memory associated with the read target data;

a step of determining, if the read target data is not present in the primary data area in the fifth cache memory, whether or not the read target data is present in a backup data area in a sixth cache memory, as a backup of the read target data stored in the primary data area in the fifth cache memory;

a step of determining, if the read target data is not present in the backup data area in the sixth cache memory, whether or not the data is present in the cache disk;

a step of determining, if the read target data is not present in the cache disk, whether or not both a data disk on the primary side associated with the read target data stored in the primary data area in the fifth cache memory, and a data disk on the backup side corresponding to the read target data stored into the backup data area in the sixth cache memory are each rotating in a normal rotation stop state in which the data disk is either rotating at a prescribed low rotation speed lower than a prescribed normal rotation speed, or is stopped;

a step of comparing a total queue size for tasks to be performed of memory cache data in the fifth cache memory, with a total queue size for tasks to be performed of memory cache data in the sixth cache memory, if both the data disk on the primary side and the data disk on the backup side are in the normal rotation stop state;

a step of spinning up, if the total queue sizes are not the same, either of the data disks having the total queue size larger than the other, up to a normal rotation state in which the data disk is rotating at the normal rotation speed, and reading out the read target data from the data disk;

a step of spinning up, if the total queue sizes are the same, either one of the data disks that stays in the rotation stop state longer than the other, spinning up and rotating the determined data disk up to the normal rotation state, and reading out the data from the read target data disk; and a step of reading out, if either of the data disk on the primary side and the data disk on the backup side is in the normal rotation stop state, the read target data from the data disk in the normal rotation state.

9. A system management program embodied on a non-transitory computer-readable medium, the program for causing a computer serving as a storage system which comprises a plurality of data disks, each of which is made up of a disk whose storage area is logically divided into one primary data area and one or more backup data areas, and a plurality of cache memories, each having a storage area logically divided into one primary data area and one or more backup data areas; and is configured to provide control of storing a data, for which a write request or a read request is made, in one of the data disks, into a primary data area in the one of the data disks and also storing the data into a backup data area of at least one of the other data disks, to function as:

a cache memory capacity detection unit that is configured to detect a current queue length for tasks to be performed in the cache memory and also detects a status of a current memory capacity by comparing the detected queue length with a prescribed first threshold and a prescribed second threshold, the second threshold being smaller than the first threshold, for classifying the memory capacity into a plurality of statuses;

a disk rotation state detection unit that is configured to detect whether the data disk is rotating at a rotation speed in a normal rotation state or in a normal rotation stop state in which the data disk is either rotating at a prescribed low rotation speed lower than the normal rotation speed or stopped;

a disk rotation state control unit that is configured to switch a rotation state of the data disk between the normal rotation state and the normal rotation stop state; and a data placement control unit that is configured to control the plurality of data disks in such a manner that the data disks are normally kept in the normal rotation stop state as long as possible and also in such a manner that, if any one of the plurality of data disks selected in response to the write request or the read request is in the normal rotation stop state, the disk rotation state control unit switches the rotation state of the selected data disk to the normal rotation state, and that, if the selected data disk is in the normal rotation state, a data as a target for the write request is transferred to the selected data disk or a data as a target for the read request is transferred from the selected data disk, and wherein the data placement control unit is further configured to:

temporarily store the write target data in the data disk selected in response to the write request, in a primary data area in the cache memory which has been associated with the data disk, and also stores a backup data of the write target data into the backup data area in at least one of the other cache memories;

if it is detected that a memory capacity corresponding to the queue length in the cache memory after the data is stored is larger than the prescribed first threshold, and if the selected data disk is in the normal rotation state, then transfers the data to the data disk; also if the selected data disk is in the normal rotation stop state, then switch the rotation state of the selected data disk to the normal rotation state and transfer the data to the data disk;

if it is detected that the memory capacity corresponding to the queue length in the cache memory after the data is stored is smaller than the first threshold and is equal to or larger than the prescribed second threshold, and if the selected data disk is in the normal rotation state, then transfer the data into the data disk; also if the selected data disk is in the normal rotation stop state, then hold the data with no transferring; and, if it is detected that the memory capacity corresponding to the queue length in the cache memory after the data is stored is smaller than the prescribed second threshold, then hold the write target data with no transferring.

* * * * *